United States Patent [19]

Nakajima et al.

[11] Patent Number: 5,532,841
[45] Date of Patent: Jul. 2, 1996

[54] FACSIMILE APPARATUS COMPRISING A PLURALITY OF IMAGE READING UNITS

[75] Inventors: Akio Nakajima, Toyokawa; Hideo Muramatsu, Shinshiro; Hiroyuki Suzuki, Toyokawa; Kanako Hamano, Hirakata, all of Japan

[73] Assignee: Minolta Camera Kabushiki Kaisha, Osaka, Japan

[21] Appl. No.: 228,924

[22] Filed: Apr. 18, 1994

Related U.S. Application Data

[63] Continuation of Ser. No. 738,588, Jul. 31, 1991, abandoned.

[30] Foreign Application Priority Data

| Jul. 31, 1990 | [JP] | Japan | 2-205671 |
| Jul. 31, 1990 | [JP] | Japan | 2-205672 |
| Jul. 31, 1990 | [JP] | Japan | 2-205673 |

[51] Int. Cl.⁶ ........................ H04N 1/00
[52] U.S. Cl. ............ 358/408; 358/442; 358/468
[58] Field of Search .................. 358/408, 404, 358/444, 442, 468, 402; 340/825.5

[56] References Cited

U.S. PATENT DOCUMENTS

| 3,647,949 | 3/1972 | Closs et al. | 358/408 |
| 3,916,384 | 10/1975 | Fleming et al. | 395/425 |
| 4,115,855 | 9/1978 | Chiba | 364/200 |
| 4,156,798 | 5/1979 | Doelz | 358/408 |
| 4,438,459 | 3/1984 | Levine | 358/408 |
| 4,622,582 | 11/1986 | Yamada | 358/408 |
| 4,797,706 | 1/1989 | Sugishima et al. | 358/448 |
| 4,947,266 | 8/1990 | Watanabe et al. | 358/408 |
| 5,040,077 | 8/1991 | Hamano | 358/407 |
| 5,123,063 | 6/1992 | Ohkubo | 358/408 |
| 5,160,923 | 11/1992 | Sugawara et al. | 340/825.5 |
| 5,218,680 | 6/1993 | Farrell et al. | 395/325 |

FOREIGN PATENT DOCUMENTS

| 63-98752 | 4/1988 | Japan . |
| 1209862 | 8/1989 | Japan . |
| 0283681 | 3/1990 | Japan . |
| 2-152363 | 6/1990 | Japan . |
| 0335327 | 2/1991 | Japan . |

*Primary Examiner*—Edward L. Coles, Sr.
*Assistant Examiner*—Thomas L. Stoll
*Attorney, Agent, or Firm*—Willian Brinks Hofer Gilson & Lione

[57] ABSTRACT

A facsimile apparatus includes a plurality of image reading units, each reading an image and converting the read image into image data, and a main controlling unit for receiving image data through a communication line and transmitting the received image data through another communication line to another facsimile apparatus of a destination. In the main controlling unit of the facsimile apparatus, a selector selects one of the image reading units, and a communication line connection controller connects the main controlling unit through the communication line with the selected one of the image reading units. Further, a data receiver receives image data from one of the image reading units cconnected throught the comunication line by the communication line connection controller.

10 Claims, 23 Drawing Sheets

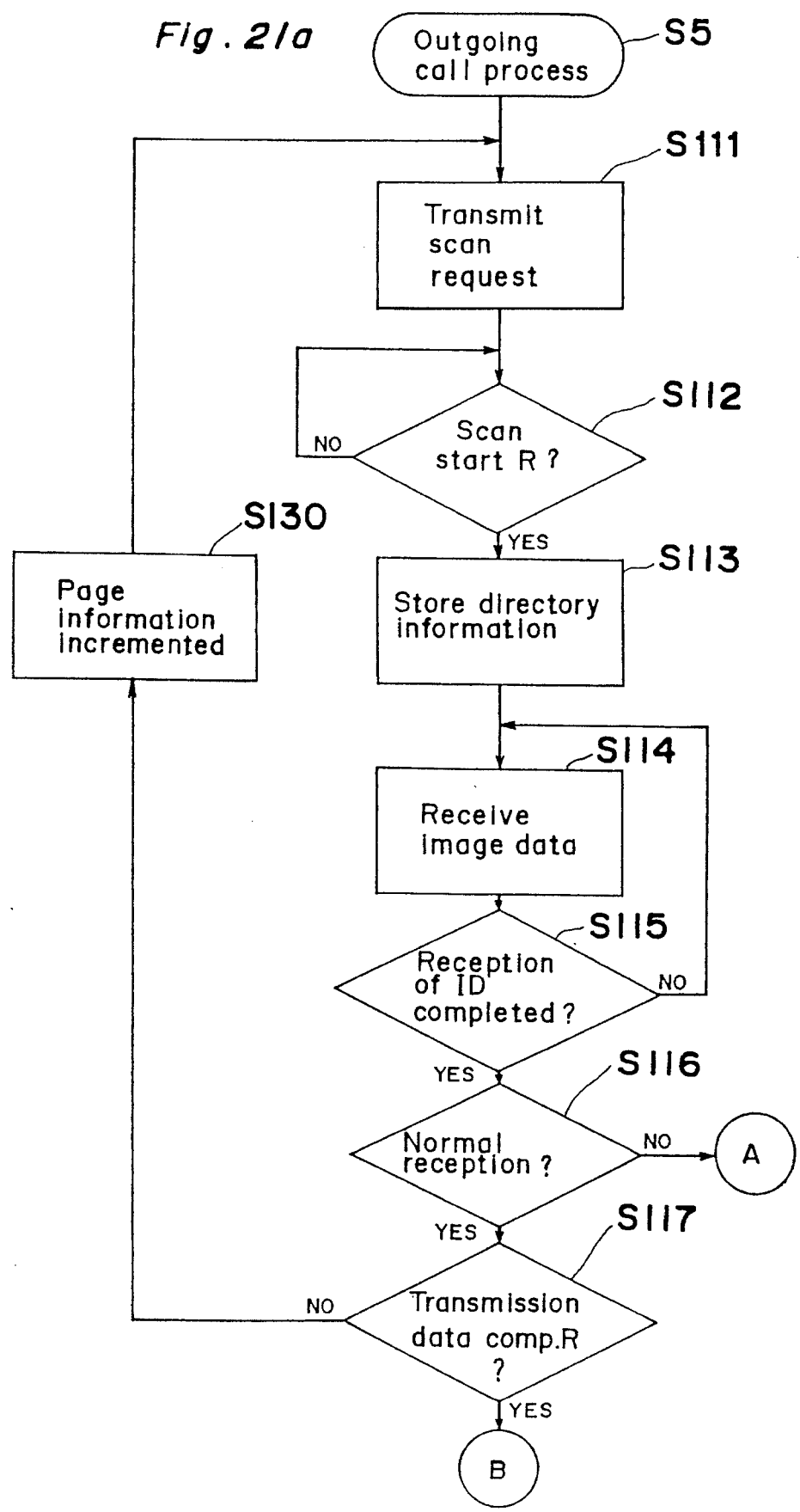

FACSIMILE APPARATUS COMPRISING A PLURALITY OF IMAGE READING UNITS

This application is a continuation, of application Ser. No. 07/738,588, filed Jul. 31, 1991, abandoned.

BACKGROUND OF THE INVENTION

1. Field of the Invention

The present invention relates to a facsimile apparatus, and more particularly, to a facsimile apparatus having a plurality of image reading units which are provided separately from a main controlling unit and are connected through a communication line with the main controlling unit.

2. Description of the Related Art

A conventional facsimile apparatus (referred to as a first prior art hereinafter) is constituted by a main controlling unit which receives and transmits image data after being connected through a telecommunication line with a facsimile apparatus of a destination or the other party, an image reading unit which reads the image of a document and converts the read image into image data, and an image recording unit for recording the image of the image data onto a paper in accordance with the inputted image data. The above three units are formed into one body in the first prior art.

Since the first prior art is necessary to be connected with a communication line, it should be placed in the vicinity of a terminal box such as a rosette or the like of the communication line. Accordingly, it is necessary to move the terminal box when the facsimile apparatus of the first prior art is to be set in a different position.

As a solution to the aforementioned drawback, the inventors of the present invention proposed another type of a facsimile apparatus (referred to as a second prior art hereinafter) in Japanese Patent laid open publication No. 2152363/1990, which has a plurality of image reading units or a plurality of image recording units arranged detachable and easily movable away from the main body.

According to the second prior art, the facsimile apparatus is provided with plurality of image reading units each of which generates digital image data corresponding to the image of a document through scanning of the image of the document, a plurality of image recording units each of which reproduces the image onto a recording paper according to the digital image data, and a line connecting unit which connects the facsimile apparatus with a communication line, i.e., signal receiving/transmitting medium for communicating with the other party. This second prior art is characterized in that the line connecting unit and each of the image reading units, and/or the line connecting unit and each of the image recording units are mutually connected with each other via a radio communication line.

However, the following disadvantage remains yet to be solved in the second prior art. In the case where a plurality of image reading units are connected to the line connecting unit in the second prior art, if one of the image reading units is reading the image of a document and transmitted the image data to the facsimile apparatus of the other party via the line connecting unit, it is impossible for the other reading units to read the image of the document, thus forcing the operator to stand by.

SUMMARY OF THE INVENTION

The object of the present invention is therefore to provide a facsimile apparatus comprising a plurality of image reading units which are connected through a communication line with a main controlling unit for transmitting image data to another facsimile apparatus of a destination, said facsimile apparatus being capable of avoiding concentrative receipt of the image data from a specific image reading unit.

In order to achieve the aforementioned objective, according to one aspect of the present invention, there is provided a facsimile apparatus comprising:

a plurality of image reading units, each of said image reading units reading an image and converting said read image into image data; and a main controlling unit for receiving image data through a communication line and transmitting said received image data through another communication line to another facsimile apparatus of a destination, said main controlling unit comprising:

selection means for selecting one of said image reading units;

communication line connection means for connecting said main controlling unit through said communication line with one of said image reading units selected by said selection means; and data reception means for receiving image data from one of said image reading units connected through said communication line by said communication line connection means.

According to another aspect of the present invention, there is provided a facsimile apparatus comprising:

at least first and second image reading units, each of said first and second image reading units reading an image and converting said read image into image data; and a main controlling unit for receiving image data through a communication line and transmitting said received image data through another communication line to another facsimile apparatus of a destination, said main controlling unit comprising:

communication line connection means for connecting said main controlling unit through said communication line selectively with one of said first and second image reading units;

data reception means for receiving image data from one of said first and second image reading units connected through said communication line by said communication line connection means; and control means for controlling said communication line connection means to connect said main controlling unit through said communication line with said second image reading unit after disconnecting said main controlling unit with said first image reading unit when an operation of said data reception means for receiving image data from said first image reading unit connected by said communication line connection means is interrupted.

According to a further aspect of the present invention, there is provided a facsimile apparatus comprising:

a plurality of image reading units, each of said image reading units reading an image and converting said read image into image data; and a main controlling unit for receiving image data through a communication line and transmitting said received image data through another communication line to another facsimile apparatus of a destination, said main controlling unit comprising:

specifying means for specifying an order of said image reading units when reading an image among said image reading units;

communication line connection means for connecting said main controlling unit through said communication line with a predetermined one of said image reading units;

data reception means for receiving image data from said predetermined one of said image reading units connected through said communication line by said communication line connection means; and control means for controlling said communication line connection means to connect said main controlling unit through said communication line with said image reading units in said order specified by said specifying means.

According to a still further aspect of the present invention, there is provided a facsimile apparatus comprising:

a plurality of image reading means, each of said image reading means reading an image of a document and converting said read image into image data;

image data processing means for receiving image data sent from a plurality of said image reading means, and transmitting said received image data to another facsimile apparatus of a destination;

inputting means for inputting an identification code for identifying respective sets of documents set on a plurality of said image reading means for respective ones of a plurality of said image reading means; and control means for controlling said image data processing means to receive image data from each of a plurality of said image reading means according to said identification code inputted by said inputting means.

Accordingly, it can be prevented that a specific one of a plurality of the image reading units remains connected to the main controlling unit for a long time, thereby avoiding concentrative receipt of the image data by the main controlling unit from the specific image reading unit. In consequence, the operator can be prevented from being kept waiting for a long time when wishing to transmit the image data to the facsimile apparatus of the other party through the main controlling unit.

Further, it is avoided that a specific one of a plurality of the image reading units is connected to the main controlling unit for a long time, allowing the other image reading unit than the specific image reading unit which has finished transmitting the image data to make access to the main controlling unit with priority.

BRIEF DESCRIPTION OF THE DRAWINGS

This and other objects and features of the present invention will become apparent from the following description taken in conjunction with one preferred embodiment thereof with reference to the accompanying drawings, in which:

FIGS. 21a to 21c are flow charts of an outgoing call process which is a subroutine of the image reading unit;

DETAILED DESCRIPTION OF THE PREFERRED EMBODIMENT

Figure 1:
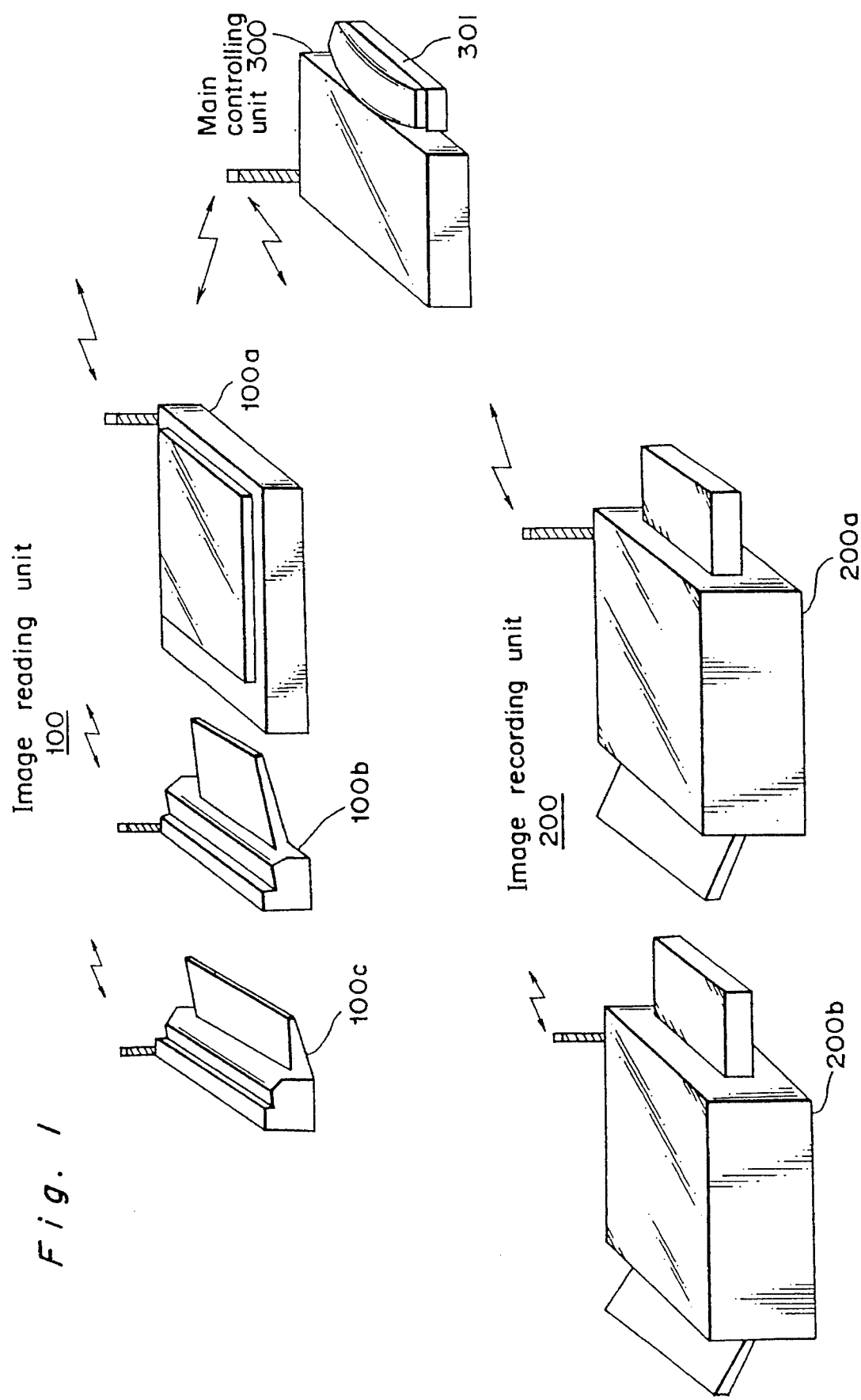
FIG. 1 is a perspective view showing a structure of a facsimile apparatus according to one preferred embodiment of the present invention.

Before the description of the present invention proceeds, it is to be noted here that like parts are designated by like reference numerals throughout the accompanying drawings.

An example of a facsimile system embodied by the present invention will be discussed hereinbelow with respect to the following items.

(1) Construction of facsimile system
(2) Construction of image reading unit
(3) Construction of image recording unit
(4) Construction of main controlling unit
(5) Communicating sequence between main controlling unit and image reading unit or image recording unit
(6) Process of main controlling unit
(7) Process of image reading unit
(8) Process of image recording unit
(9) Other embodiments
(1) Construction of Facsimile System FIG. 1 is a perspective view showing the construction of a facsimile system according to one preferred embodiment of the present invention.

Referring to FIG. 1, a facsimile system of the present embodiment is provided with a main controlling unit having a telephone set 301 and connected to a telephone line. The main controlling unit 300 transmits or receives an image signal to and from a facsimile apparatus of a destination or the other party via the telephone line. The facsimile system further includes three image reading units 100*a*, 100*b* and 100*c* (generally referred to as an image reading unit 100 hereinafter) which reads the image of a document and transmits image data of the document to the main controlling unit 300 via a radio communication line, and two image recording units 200*a* and 200*b* (generally referred to as an image recording unit 200 hereinafter) which prints the image of the image data onto a paper after receiving the image data from the main controlling unit 300 via the radio communication line. Two kinds of the image reading units are offered in the present facsimile system, namely, a book-type image reading unit 100*a* and ADF-type unit image reading units 100*b* and 100*c*. The book-type unit is equipped with a document glass of a flat bed to read images of a plurality of documents, for example, documents bound in a book, while the ADF-type unit is provided with an automatic document feeder.

The radio communication line uses a carrier wave of one frequency in VHF band or UHF band, with gaining access using the polling selecting method as will be described more in detail later so that the main controlling unit 300 controls the image reading unit 100 and image recording unit 200 by a control signal. A sending party transmits the carrier wave modulated by, e.g., PSK modulation method according to the image data and control signals to a receiving party. Meanwhile, the receiving party demodulates the modulated carrier wave.

Figure 2:
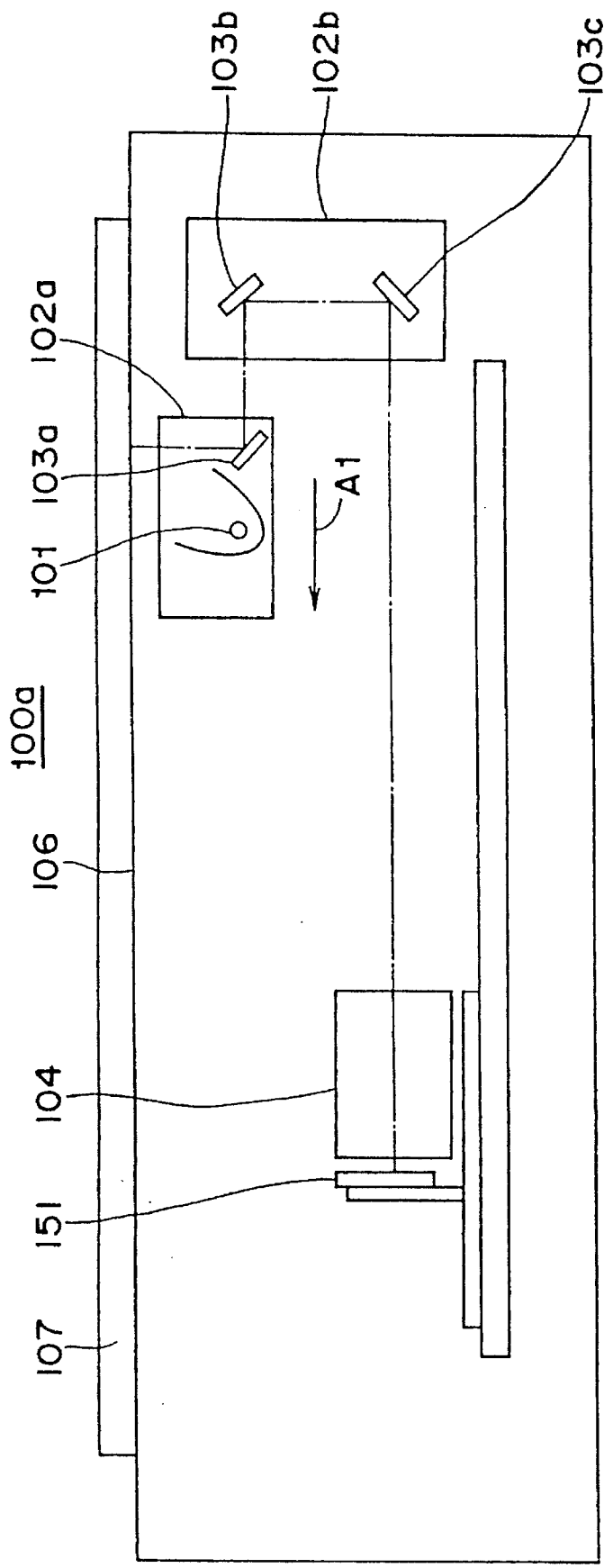
FIG. 2 is a cross sectional view of a mechanism part of a book-type image reading unit of FIG. 1.

FIG. 2 shows a cross section of a mechanism part of the book-type image reading unit 100*a* of FIG. 1.

As is clear from FIG. 2, the book-type image reading unit 100*a* is of such a structure that optical systems 102*a* and 102*b* are moved in a direction shown by an arrow A1. When a document is set on a document bet 106 and a document cover 107 is closed, an exposure lamp 101 illuminates the document. The reflecting light from the document is reflected by mirrors 103*a*, 103*b* and 103*b* and condensed by a lens 104 at a photoelectric converting part 151 comprised of CCDs. The image of the condensed light is read and converted into electric signals by the photoelectric converting part 151.

Figure 3:
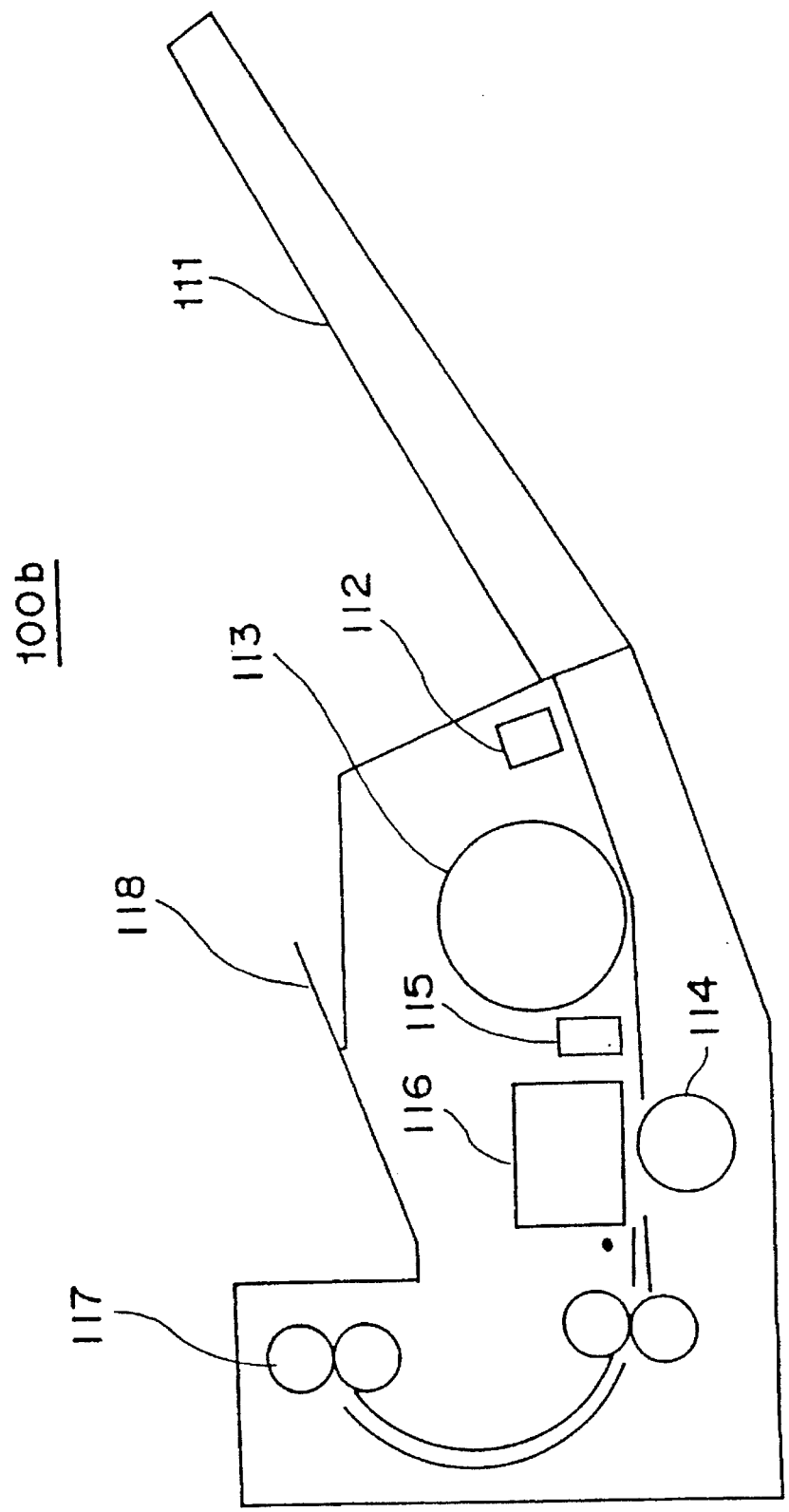
FIG. 3 is a cross sectional view of a mechanism part of an ADF-type image reading unit of FIG. 1.

FIG. 3 shows a cross section of a mechanism part of the ADF-type image reading units 100*b* and 100*c* of FIG. 1. The description below represents the case of the image reading unit 100*b*. The image reading unit 100*b* performs reading of the image in the same manner as the prior art.

Referring to FIG. 3, the presence of a plurality of documents on a document tray 111 is detected by a document sensor 112. The documents are transferred one by one to a sensor 115 by a pickup roller 113. Then, the image is read by an adhering-type linear image sensor 116 in synchronization with a rotation of a feeding roller 114 by a motor (not shown) and a reading of the image sensor 116, and the image of the document is converted into electric signals. After the image is read, the document is discharged by a discharge roller 117 to a discharge tray 118.

Figure 4:
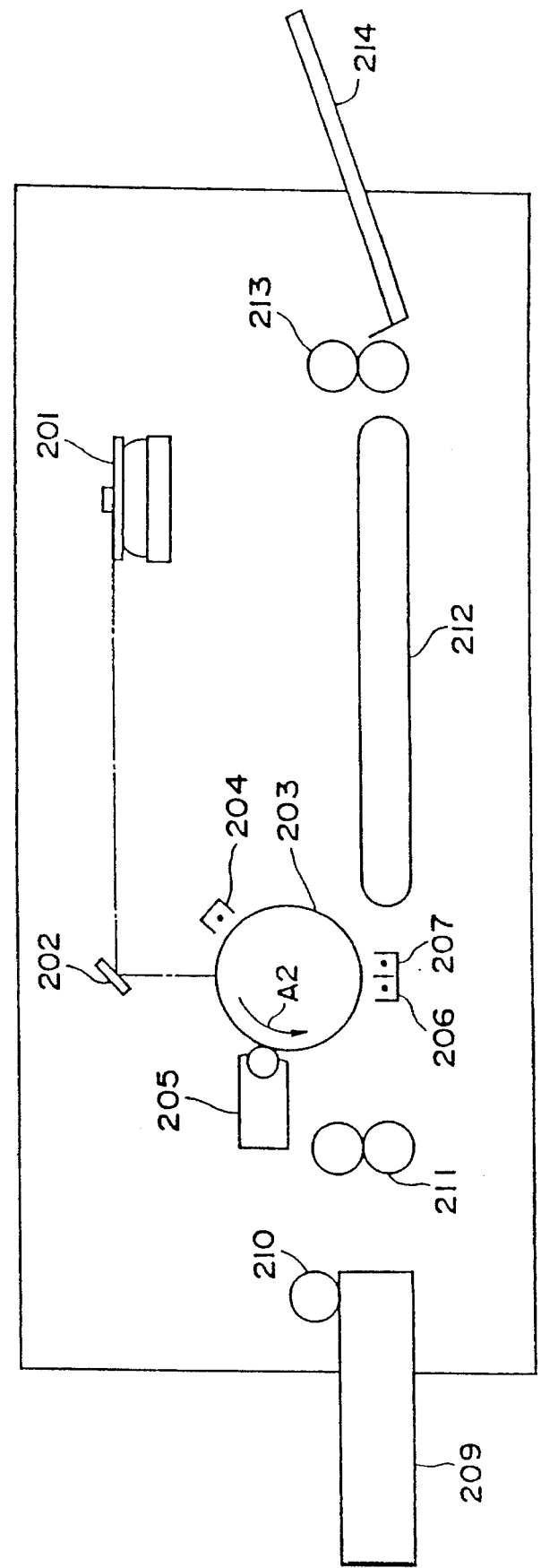
FIG. 4 is a cross sectional view of a mechanism part of an image recording unit of FIG. 1.

FIG. 4 shows a cross section of a mechanism part of the image recording unit 200 shown in FIG. 1, which is constituted by a laser printer using a conventional electrophotographic process. In the reading unit 200 of FIG. 4, the inputted binary-coded image signal is converted into a light by a current to light converting part 201 consisting of a laser optical system. The obtained modulated light is scanned in a main scanning direction and exposed to a photosensitive drum 203 through a mirror 202. The photosensitive drum 203 rotated in a direction shown by an arrow A2 is uniformly charged by a corona charger 204 prior to the exposure, so that an electrostatic latent image corresponding to the received image data is formed on the photosensitive drum 203. Subsequently, toners are supplied to the electrostatic latent image from a developing device 205, whereby a toner image is formed on the photosensitive drum 203.

On the other hand, the papers set in a paper feed tray 209 are taken out one by one by a pickup roller 210, and sent to a transfer charger 206 by a paper feed roller 211. The transfer charger 206 transfers the toner image formed on the photosensitive drum 203 onto the paper while keeping a timing with the paper. The paper after the transfer is separated from the photosensitive drum 203 by a separating charger 207, and then sent to a fixing roller 213 by a transfer belt 212 for a predetermined thermal fixing treatment. The toner image is fixed on the paper by the thermal fixing treatment. Thereafter, the paper is discharged to a discharge tray 214.

(2) Construction of Image Reading Unit

Figure 5:
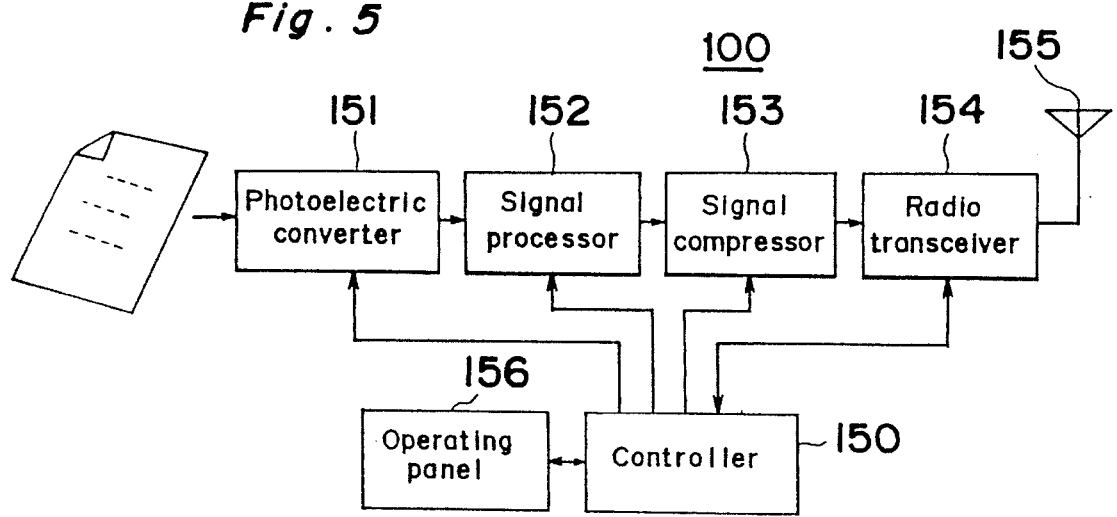
FIG. 5 is a block diagram of a structure of the image reading unit of FIG. 1.

FIG. 5 is a block diagram showing a construction of the image reading unit 100 of FIG. 1.

In FIG. 5, a photoelectric converter 151 which is provided with an image sensor reads and converts the image of the document to image signals, and outputs the same to a signal processor 152. The signal processor 152 processes the input image signals through an analog to digital conversion, which are further subjected to data correction process, for example, Y conversion process or the like, and then binarized to binary image data. The obtained binary image data is output to a signal compressor 153. Thereafter, the signal compressor 153 compresses the binary image data according to a predetermined coding method, for example, well-known MR coding method or MH coding method. Thereafter, the image data is outputted to a radio transceiver 154.

The radio transceiver 154 modulates a carrier wave according to the input image data from the signal compressor 153, and projects a radio wave of the modulated carrier wave to the main controlling unit 300 through an antenna 155. Similarly, the radio transceiver 154 also modulates the carrier wave according to the control signals inputted from a controller 150, projecting a radio wave of the modulated wave to the main controlling unit 300 through the antenna 155. In addition, when the radio transceiver 154 receives a ratio wave projected from the main controlling unit 300 via the antenna 155, it demodulates the received radio wave into a control signal and outputs it to the controller 150.

Figure 6:
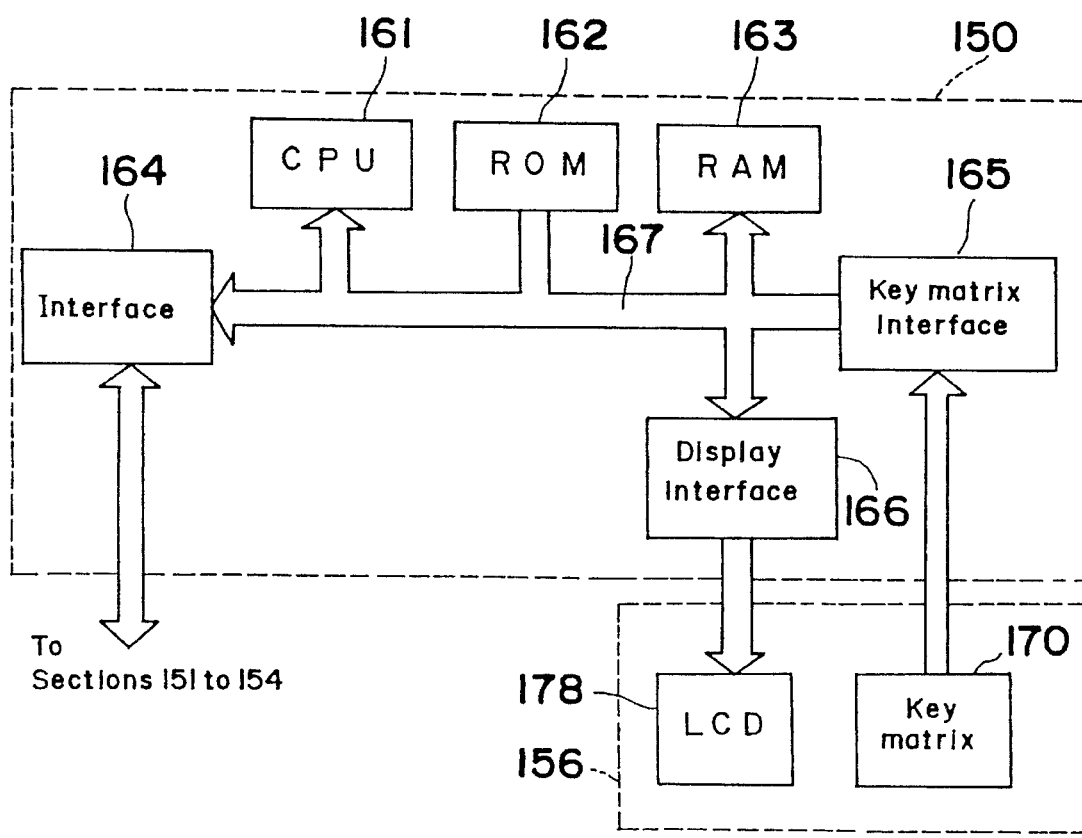
FIG. 6 is a block diagram of a structure of a controller of the image reading unit of FIG. 5.

FIG. 6 is a block diagram of the above-mentioned controller 150 of the image reading unit 100 in FIG. 5.

The controller 150 in FIG. 6 is provided with a central processing unit 161 (referred to as a CPU hereinafter) for controlling the image reading unit 100 shown in FIG. 5, a read only memory 162 (referred to as a ROM hereinafter) for storing a system program for the CPU 161 and data necessary to execute the system program, and a random access memory 163 (referred to as a RAM hereinafter) for storing controlling parameters, a status, flags and the other various kinds of data necessary to carry out the system program. Furthermore, the controller 150 is provided with an interface circuit 164 for external equipments which is connected to the component parts 151–154 of FIG. 5, a key matrix interface circuit 165 connected to a key matrix 170 of an operating panel 156 and a display interface 166 connected to an LCD 178.

These component parts 161–166 within the controller 150 are connected to each other via an internal bus 167.

The controller 150 controls the parts 151–154 of the image reading unit 100 in response to a command inputted by the operator through the key matrix 170 of the operating panel 156, thereby allowing the image reading unit 100 to operate as will be described later, while outputting and displaying the instructing information and state information of the facsimile system to the operator through an LCD of the operating panel 156.

Necessary status, flags and data to execute the system program are stored in the RAM 163, which will be depicted hereinbelow.

(A) Status

One of the following five status is set by the controller 150 in accordance with the state of the image reading unit 100.

(A-a)=Ready: A document is put on the document glass 106 or document tray 111 and a telephone number of the facsimile apparatus of the other party (referred to as a facsimile number hereinafter) is inputted, with a transmission key 172 depressed. In other words, the image of the document is ready to be read at any time.

(A-b)=Busy: A command signal requiring scanning of the document (scan request) is received from the main controlling unit 300 in the ready state, so that the image reading unit 100 is performing reading of the document.

(A-c)=Error: A jamming is brought about as the image reading unit is reading the document or the front cover of the image reading unit 100 is opened. That is, the operator is required to do something to re-start the facsimile.

(A-d)=Fatal: A trouble happens in the image reading unit 100, i.e., a maintenance man should be called therefor.

(A-e)=Not ready: The status of the above "error" and "fatal" is not set, without a transmitting manipulation, e.g., to set a document or the like done.

(B) Transmission Flag

The transmission key 172 is turned ON when the subject transmission flag is 1.

(C) Facsimile Number of the Other Party

Figure 7:
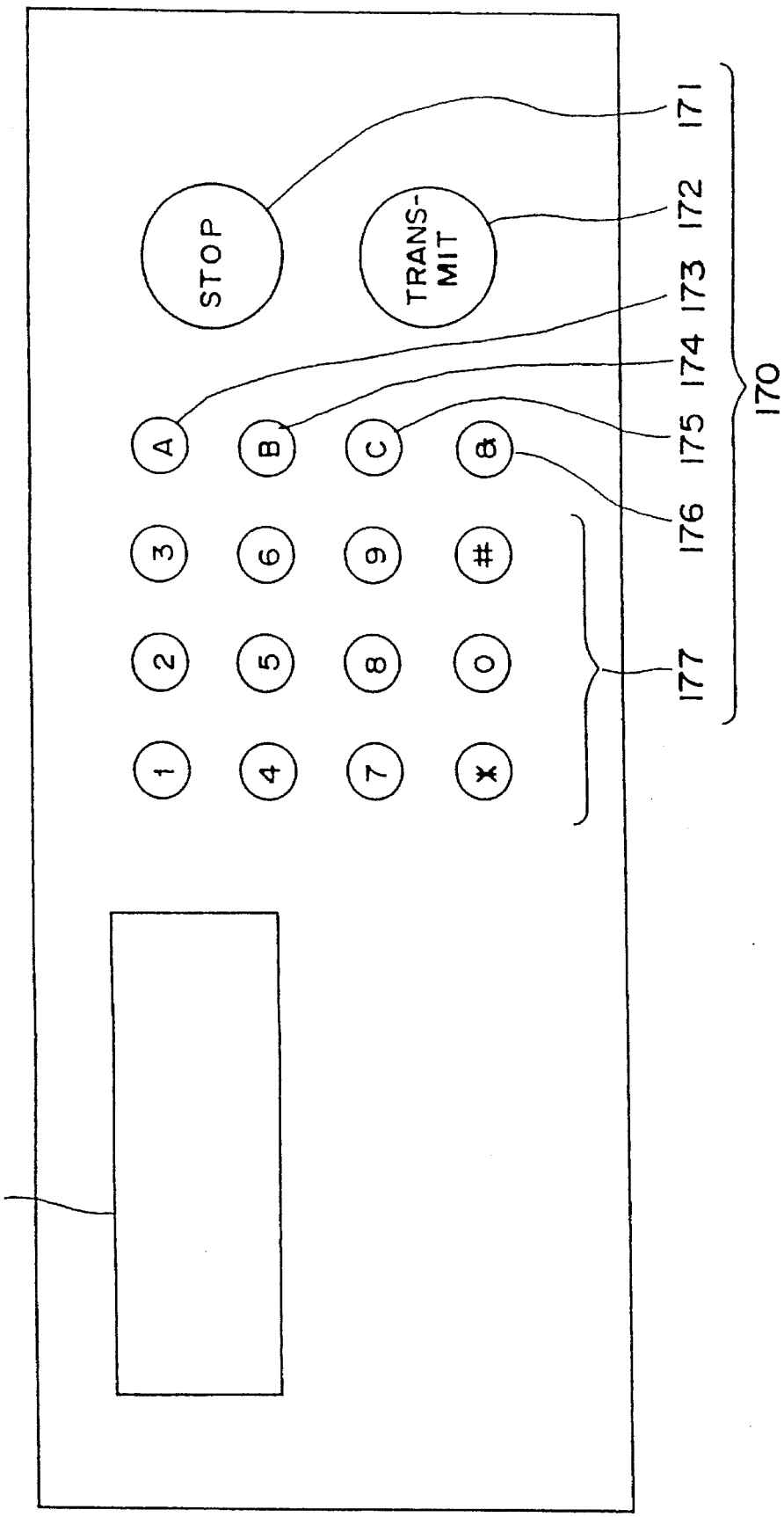
FIG. 7 is a front elevational view of an operating panel of the image reading unit of FIG. 5.

FIG. 7 shows a front elevational view of the operating panel of the image reading unit 100 of FIGS. 5 and 6.

In FIG. 7, the operating panel 156 has the key matrix 170 and liquid crystal display 178 (referred to as an LCD) for informing a message to the operator.

The key matrix 170 includes a telephone ten key 177 to be used for setting the facsimile number of the other party, etc. and constituted by numerical keys "0" through "9", an asterisk key "*" and a sharp key "#". When the image of the document placed on the document glass 106 or document tray 111 is to be read and converted to facsimile signals for transmission, the transmission key 172 is used. Reading is stopped through a stop key 171. Moreover, various kinds of operations are ordered through function keys 173, 174 and 175 of the key matrix 170. A continuous reading key 176 is provided so as to order reading of the image by another or a plurality of the other image reading units 100 subsequent to one image reading device 100. The concrete manipulation of this continuous reading will be explained later.

(3) Construction of Image Recording unit

Figure 8:
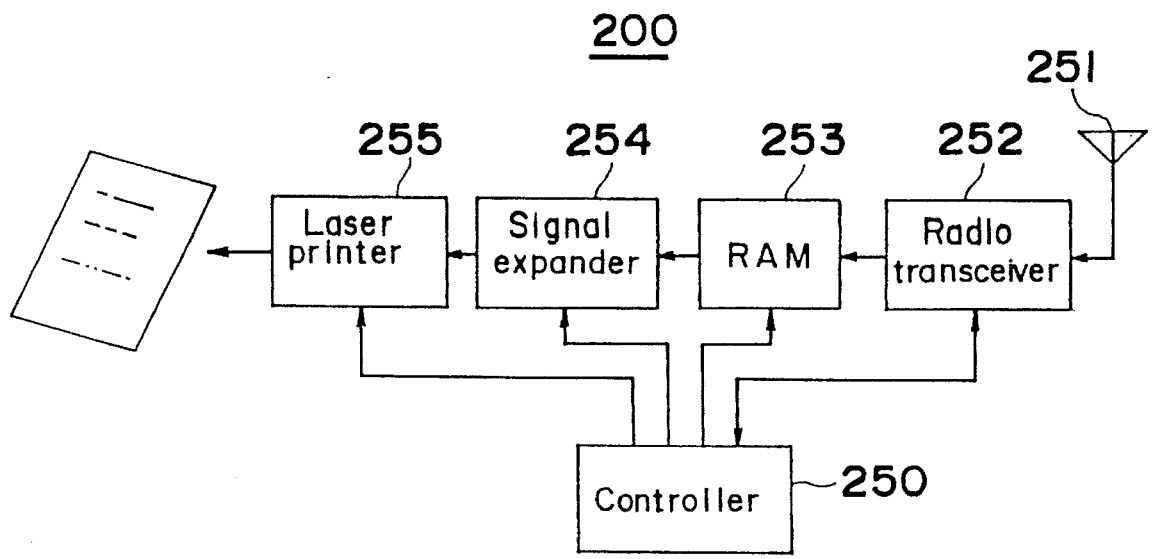
FIG. 8 is a block diagram of a structure of the image recording unit of FIG. 1.

FIG. 8 is a block diagram showing the construction of the image recording device 200 shown in FIG. 1.

In the image recording unit 200 shown in FIG. 8, a radio transceiver 252, when receiving a radio wave projected from the main controlling unit 300 through an antenna 251, demodulates received radio wave into image data or a control signal, and outputs the image data to a RAM 253 and the control signal to a controller 250. The image data are stored in RAM 253. Further, the radio transceiver 252 modulates a carrier wave according to the control signals from the controller 250 and projects the modulated radio wave to the main controlling unit 300 through the antenna 251.

A signal expander 254 reads the image data from RAM 253 to carry out expansion of the image data, which is reverse to the compressing process by the signal compressor 153, thereby converting the image data to image signals and outputting to a laser printer 255. The laser printer 255 subsequently performs printing on every printing paper in accordance with the input image signals.

The controller 250 controls each component part 252–255 according to the control signals from the main controlling unit 300 inputted through the radio transceiver 252, thus allowing the image recording unit 200 to read the image as will be described later.

(4) Construction of Main Controlling Unit

Figure 9:
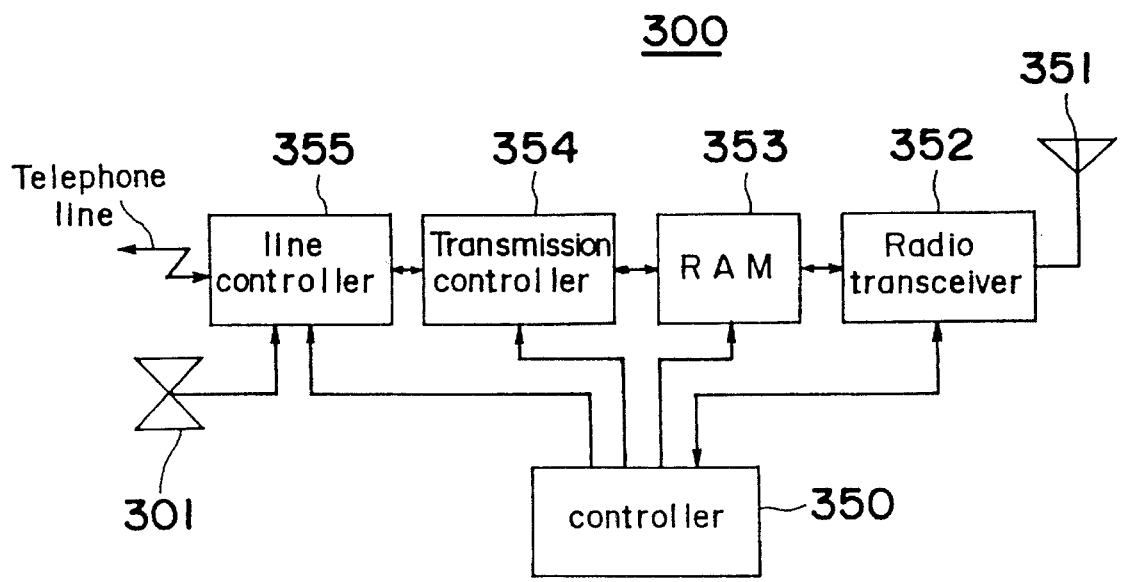
FIG. 9 is a block diagram of the structure of a main controlling unit of FIG. 1.

FIG. 9 is a block diagram of a construction of the main controlling unit 300 shown in FIG. 1.

Referring to FIG. 9, a radio transceiver 352 receives a radio wave projected from the image reading unit 100 or image recording unit 200 through an antenna 351 and demodulates the received radio wave to image data or a control signal. The image data are outputted and stored in a RAM 353, while the control signals are outputted to a controller 350. The radio transceiver 352 also reads out the image data stored in RAM 353 after being received through a telephone line and modulates a carrier wave according to the read image data. The modulated carrier wave are projected to the image recording unit 200 through the antenna 351. Further, the radio transceiver 352 modulates the carrier wave according to a control signal inputted from the controller 350 and projects a radio wave of the modulated carrier wave to the image reading unit 100 or image recording unit 200 through the antenna 351.

A transmission controller 354 is equipped with a modulator/demodulator, where the carrier wave is modulated according to the image data stored in RAM 353 using a predetermined modulating procedure. The obtained facsimile signals are transmitted through a line controller 355 and the telephone line to the facsimile of the other party. At the same time, the facsimile signal received through the telephone line and the line controller 355 is demodulated and converted into image data, and then stored in RAM 353.

The line controller 355 is connected to the telephone line and a telephone set 301, and provided with a dialer and a network control unit (NCU). The telephone set 301 is connected to the telephone line when the facsimile system is not used in a telephone mode. On the other hand, when the facsimile number is transmitted to and received from the facsimile apparatus of the other party in a facsimile mode, a predetermined telephone line is connected or disconnected.

The controller 350 controls the component parts 352–355 the main controlling unit 300 in accordance with a transmission request command signal generated as a result of the operator's manipulation of the operating panel 156 of the image reading unit 100 and an incoming signal from the telephone line as described in detail later.

Figure 11:
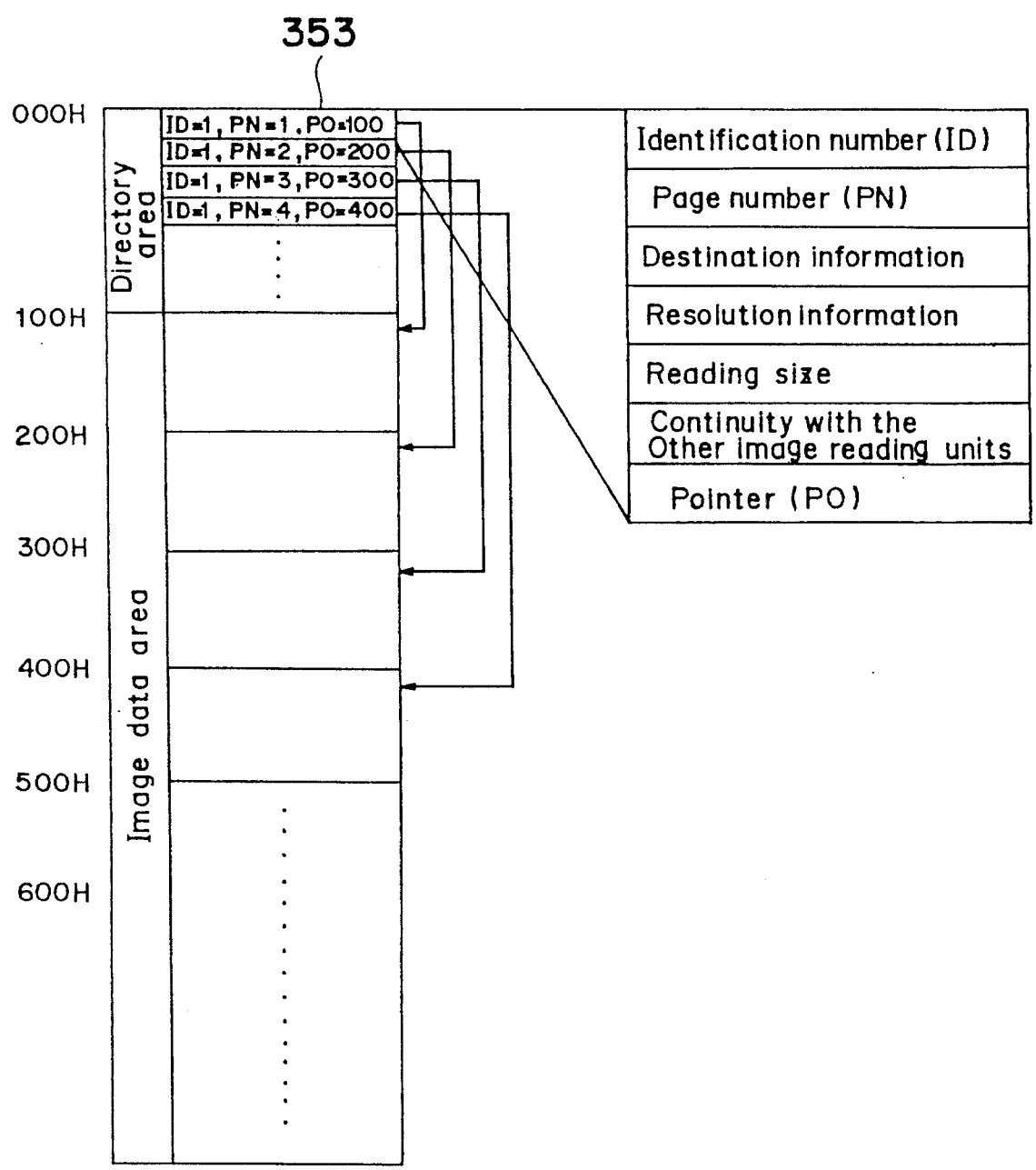
FIG. 11 is a diagram of a memory map of a RAM of FIG. 9.

FIG. 11 illustrates a memory map of the RAM 353 of FIG. 9.

As shown in FIG. 11, the RAM 353 is roughly divided into a directory area having addresses 000H-0FFH in hexadecimal notation and an image data area having addresses 100H to FFFH in hexadecimal notation. The directory area stores the following information for every image data of one page read by the image reading unit 100.

(A) Identification Number (ID) of Image Reading Unit 100:

According to the instant embodiment, each image reading unit 100 is given a respective identification number as follows;

Image reading unit 100a ← ID=1

Image reading unit 100b ← ID=2

Image reading unit 100c ← ID=3

(B) Page number (PN):

A page number is given for every document image.

(C) Information of the Other Party:

A facsimile number of the other party.

(D) Information of Resolution:

(E) Reading Size:

(F) Information of Continuity with the Other Reading Units:

Since one image reading unit 100 affords to read 30 sheets of documents at the maximum, two or more image reading units 100 may sometimes be used to read a larger number of documents. For such case, the information data of the other image reading units 100 which should read the documents continuously with the image reading document 100 is stored.

(G) Pointer (PO):

A leading address where the image data are stored in the image data area.

Figure 10:
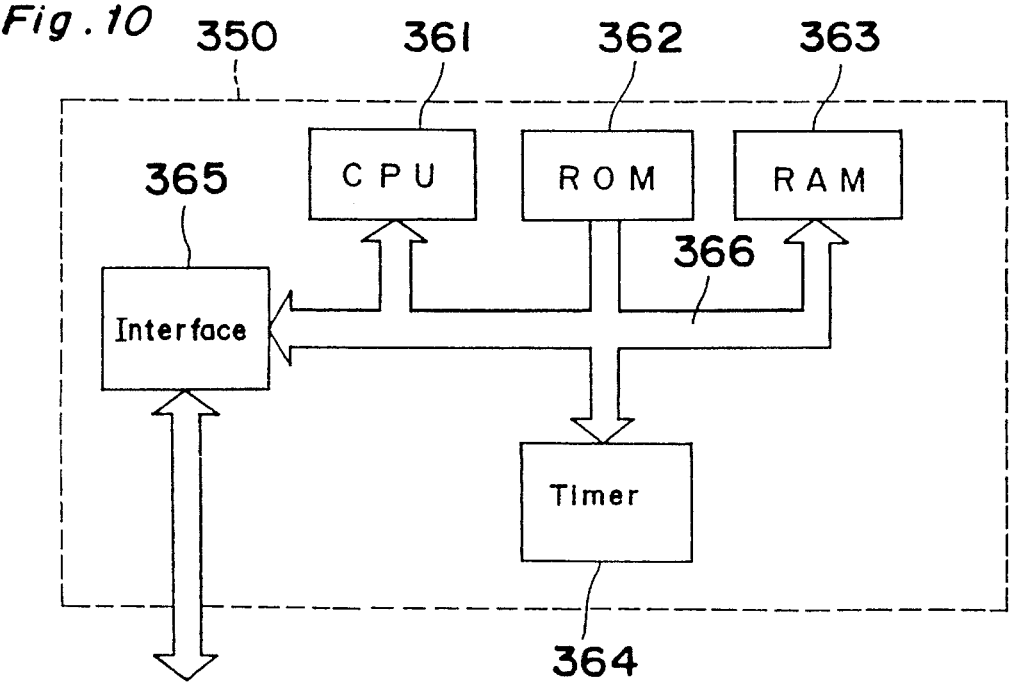
FIG. 10 is a block diagram of the structure of a controller of the main controlling unit of FIG. 9.

The controller 350 shown in FIG. 10 comprises a CPU 361 for controlling the main controlling unit 300 of FIG. 9, a ROM 362 for the storing a system program for the CPU 361 and data necessary to execute the system program, and a RAM 363 for storing controlling parameters, flags and the other kinds of data to carry out the system program. There are also provided in the controller 350 a timer circuit 364 which repeatedly counts a predetermined time for a timer interrupting process to be described later, and an interface circuit 365 for the external equipments connected to the component parts 352–355 of FIG. 9.

The parts 361–365 in the controller 350 are connected with each other via an internal bus 366.

RAM 363 stores the following parameters to carry out the system program.

(A) Priority Parameter (PP):

An integer not smaller than 0 is assigned for every image reading unit 100 to indicate a priority order when the main controlling unit 300 makes access to the image reading units 100. The smaller the parameter, the higher the priority order. A status request command signal is sent to the subject image reading device 100 only when the priority parameter PP is 0 (NO at step S402 of FIG. 19) in the instant embodiment. The parameter PP is reset to 0 in the initialization step of the main controlling unit 300 (referring to step S1 in FIG. 16), and set to a predetermined value after one reading of the document (5 in the instant embodiment) (referring to step S131 in FIG. 21b). When the identification number ID of the image reading unit 100 set in the timer interrupting process (with reference to FIG. 19) is designated and the corresponding parameter PP is positive, the parameter PP is decremented by one (See step S403).

Figure 21B:
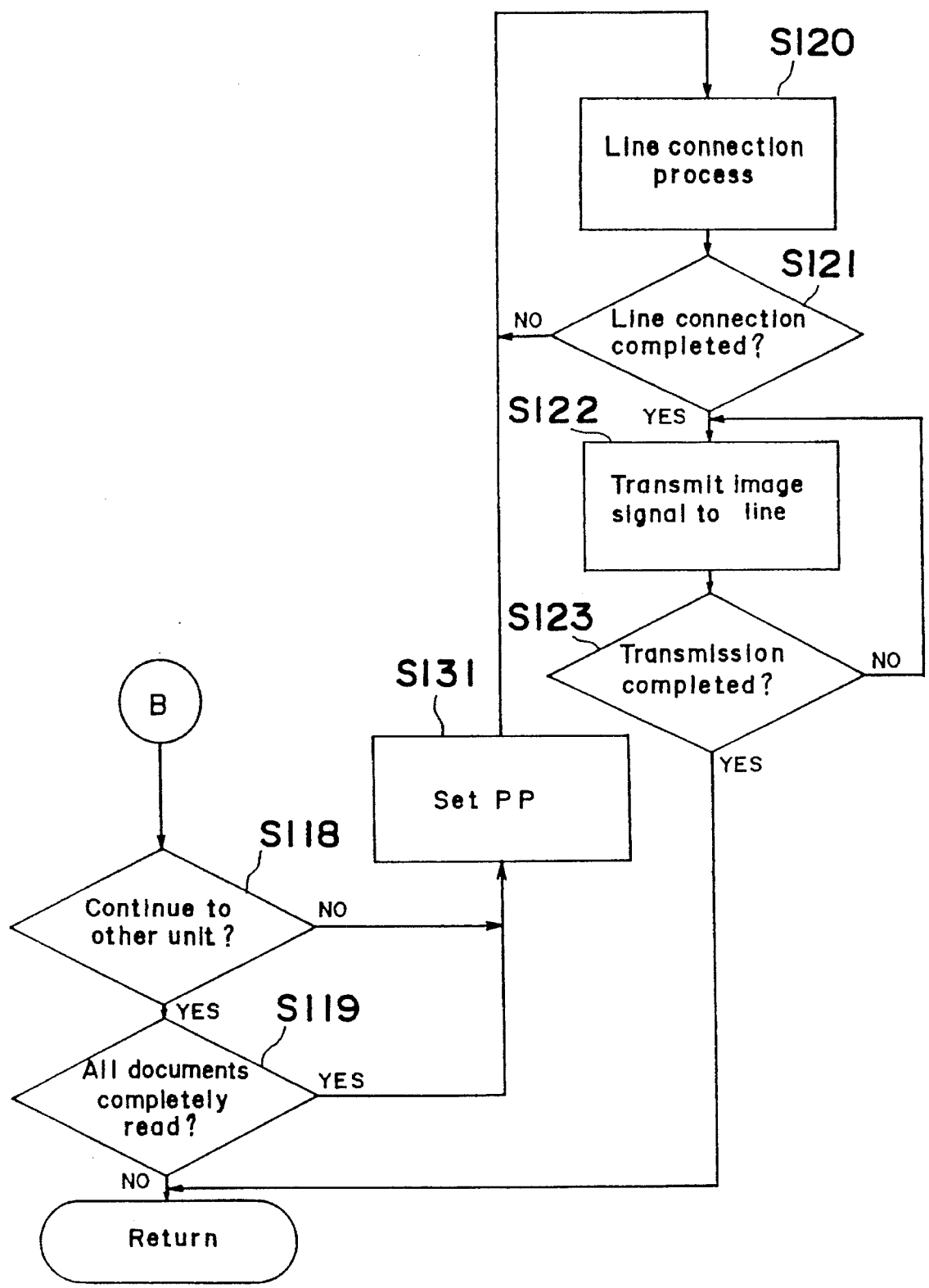

A value of the priority parameter PP set in the above step S131 in FIG. 21b is determined beforehand from the number of the image reading units 100 and image recording units 200 connected to the main controlling unit 300 and the polling cycle, etc. Since the polling priority order is arranged for each of the image reading units 100 and image recording units 200 by the priority parameter PP, concentrated use of a specific image reading unit 100 can be avoided, thereby improving the using convenience of the facsimile system.

(5) Communicating sequence between main controlling unit and image reading unit or image recording unit Communications between the main controlling unit 300 and image reading unit 100 and between the main controlling unit 300 and image recording unit 200 are made according to the following polling selecting procedure with use of the controlling signals.

(a) The main controlling unit 300 transmits a status request signal to one image reading unit 100 or image recording unit 200.

(b) When acknowledging the signal as directed to itself, the one image reading unit 100 or image recording unit 200 transmits a status answer signal to the main controlling unit 300. Upon necessities, a report signal is added to the status answer signal, which is transmitted to the main controlling unit 300.

(c) The main controlling unit 300 transmits a status request signal to a succeeding image reading unit 100 or image recording unit 200 a predetermined time later (20 milliseconds in the present embodiment) after it receives the answer signal from the one image reading unit 100 or image recording unit 200 in the timer interrupting process (See FIG. 19) which will be described later.

The status answer signal transmitted from the image reading unit 100 or image recording unit 200 to the main controlling unit 300 is comprised of the following data.

<a> Identification code (ID):

One of the image reading units 100 or image recording units 200 is identified by this code. Each image reading unit 100 has such an identification number as described earlier, while each image recording unit 200 has the code assigned as follows;

Image recording unit 200a ←ID=4

Image recording unit 200b ←ID=5

<b> Report:

Data of a response to a command received from the main controlling unit 300.

<c> Status:

Although one of the five status is set for each image reading unit 100 as mentioned earlier, it is detected for each image recording unit 200 whether the unit is in the printable state when it receives the image data from the main controlling unit, and whether a jamming, a lack of papers or a trouble is caused in the case where the unit is not in the printable state.

<d> Data:

A data indicating the length of the image and the image data constitute this data, which is added to a command signal from the main controlling unit 300 or an answer signal from the image reading unit 100.

Three kinds of report signals are added upon necessities to the status request signal received by the image reading unit 100 from the main controlling unit 300.

((a)) Scanning start report:

To indicate start of scanning operation by the image reading unit 100 for reading the image in response to the scanning request command signal from the main controlling unit 300.

((b)) Scanning end report:

To indicate completion of reading of the image data of one page.

((c)) Transmitting data completion report:

To indicate completion of reading of the image data of all pages.

The image reading unit 100 performs an image data transmitting process in a main routine after the scanning start signal is transmitted (with reference to step S220 of FIG. 22 b), with transmitting the following data:

(a) Page number (b) Information of destination (c) Information of resolution (d) Reading size (e) Information of continuity with the other image reading units 100

(f) Image data start flag + image data + image data end flag

Transmission of the status request signal is prohibited while the main controlling unit 300 is receiving the aforementioned data.

Figure 12:
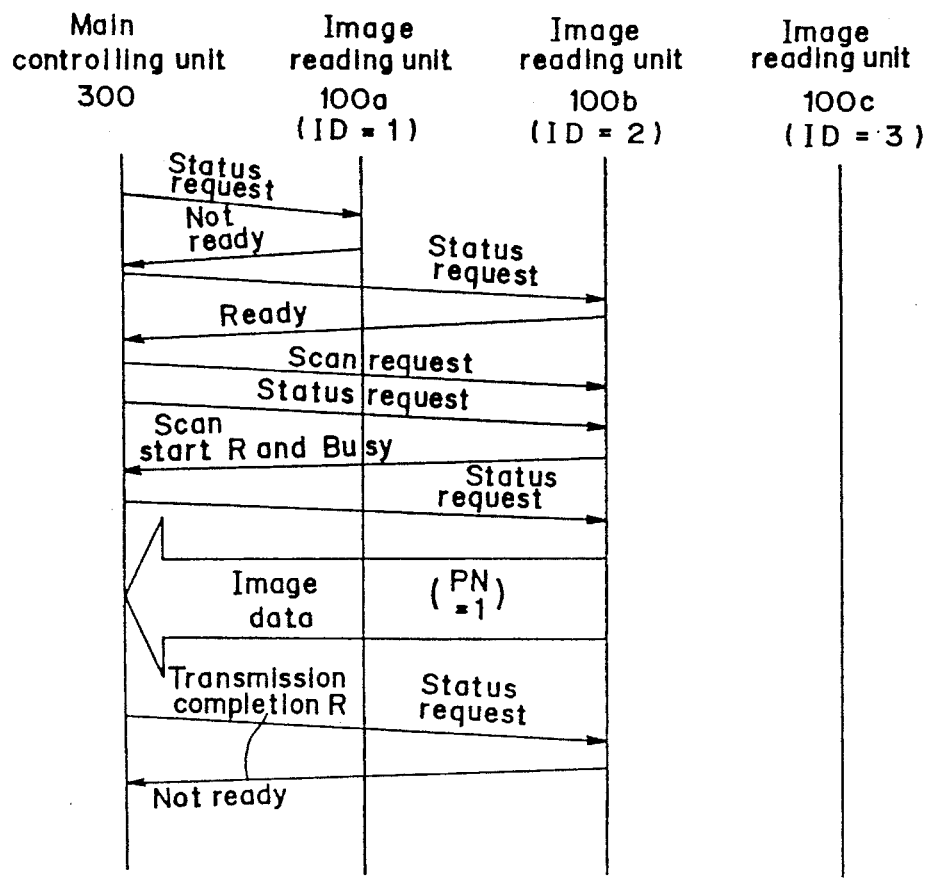
FIGS. 12, 13a and 13b are diagrams of a communicating sequence between the main controlling unit and each image reading unit.

In FIG. 12, a communicating sequence between the main controlling unit 300 and each of the image reading units 100a and 100b is indicated, wherein the image reading unit 100a is in the not ready state, and the image reading unit 100b is in the ready state.

As shown in FIG. 12, when the main controlling unit transmits the status request signal to the image reading unit 100a , the image reading unit 100a transmits a status state signal showing the not ready state to the main controlling unit 300.

Thereafter, when the main controlling unit 300 transmits the status request signal to the image reading unit 100b , the image reading unit 100b in turn sends back the status state signal showing the ready state to the main controlling unit 300. At this time, the main controlling unit 300 judges that the image reading unit 100b has been perfectly prepared for reading a document image, and transmits the scanning request command signal and status request signal to the image reading unit 100b. In consequence, the image reading unit 100b starts to read the image, with transmitting the status state signal of the busy state and the scanning start report signal to the main controlling unit 300. Furthermore, the main controlling unit 300 sends the status request signal to the image reading unit 100b. In response thereto, the image reading unit 100b reads and sends the image data of one page to the main controlling unit 300. After receiving the image data, the main controlling unit 300 transmits the status request signal to the image reading unit 100b. The image reading unit 100b responds to this signal thereby sending the transmission completion report signal indicating that the image data of all pages is completely transmitted and the status state signal of the not ready state to the main controlling unit 300. Thus, the image data is completely transmitted from the image reading unit 100bto the main controlling unit 300.

Figure 13A:
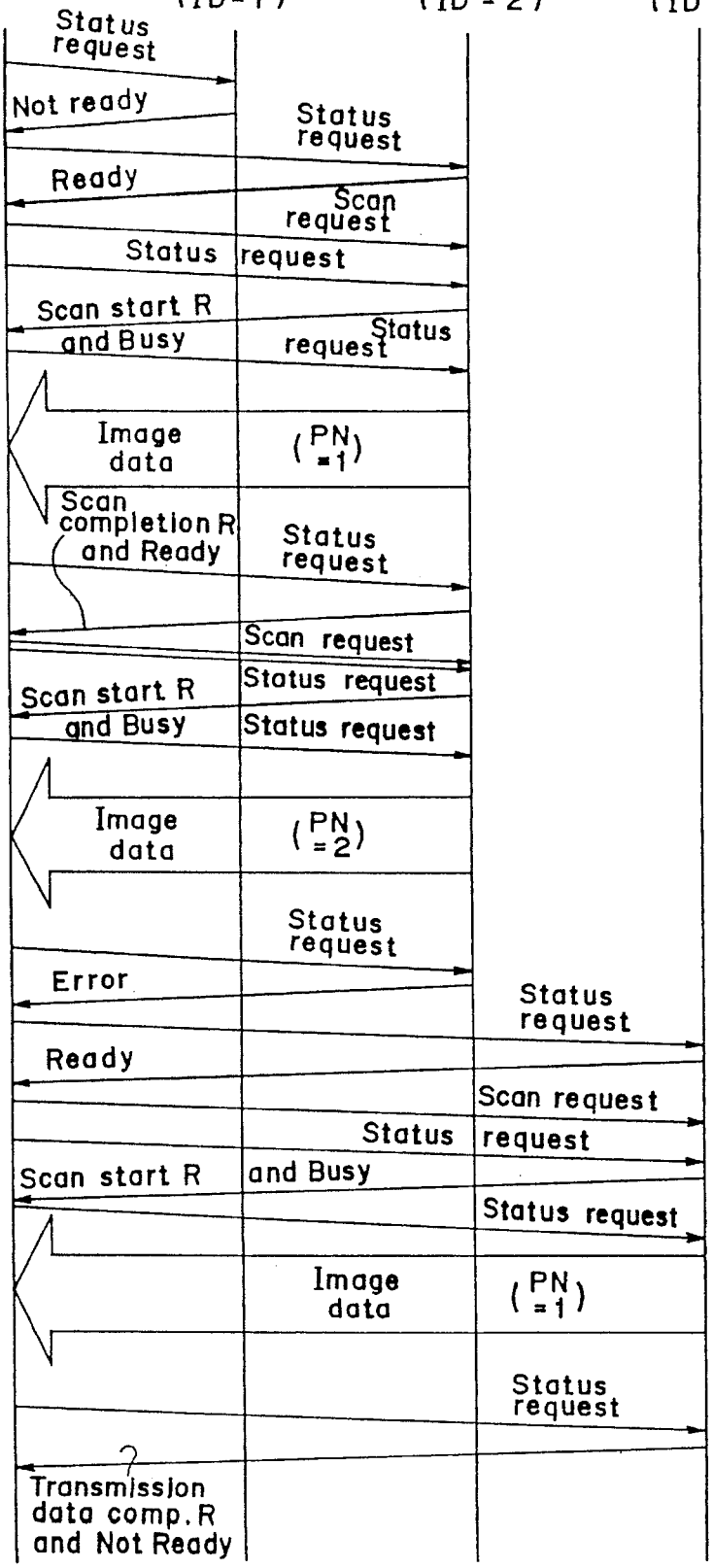
Figure 13B:
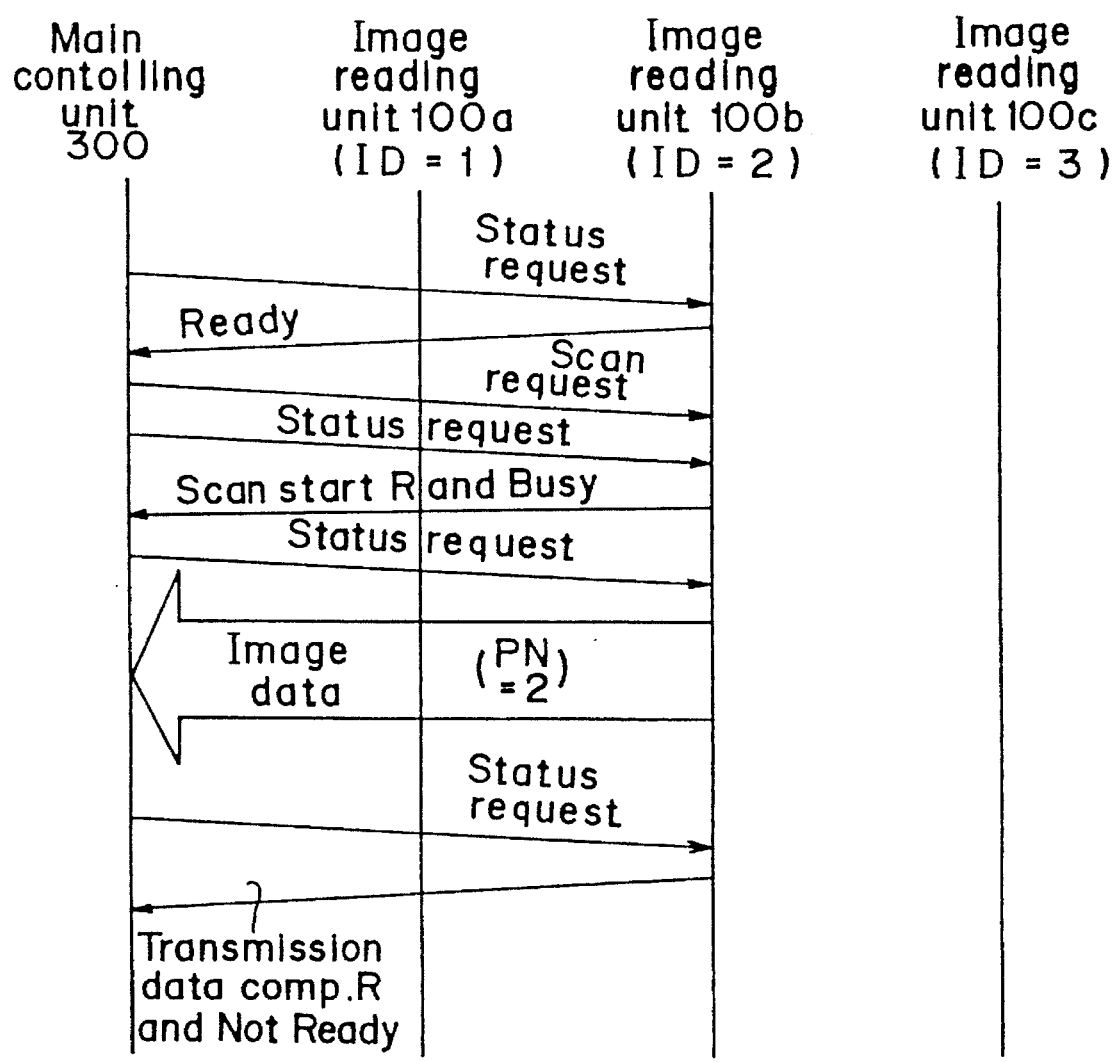

FIGS. 13a and 13b show a communicating sequence between the main controlling unit 300 and image reading units 100a, 100b and 100c in the case where the main controlling unit 300 interrupts to receive the image data from the image reading unit 100c when a jamming is brought about while the image reading unit 100b is transmitting the image data of a second page to the main controlling unit 300.

As is clear from FIG. 13a, when a jamming is given rise to within the image reading unit 100b when the image reading unit 100b is transmitting the image data of the second page to the main controlling unit 300, the image reading unit 100b transmits the status state signal of the error state to the main controlling unit 300 in response to the status request signal sent from the main controlling unit 300. Then, the main controlling unit 300 sends the status request signal to the other image reading unit 100c, and then, the image reading unit 100c transmits the status state signal of ready to the main controlling unit 300. The image data is accordingly transmitted to the main controlling unit 300 from the image reading unit 100cin the same manner as that in the communicating sequence shown FIG. 12. When the transmission is completed, the main controlling unit 300 sends the status request signal to the image reading unit 100b as indicated in FIG. 13b. At this time, if the jamming state is solved and the image reading unit 100b is turned to be ready for reading an image, the image reading unit 100b sends the status state signal of the ready state to the main controlling unit 300, and then, the image data of the second page is transmitted in the manner similar to the above.

Figure 14:
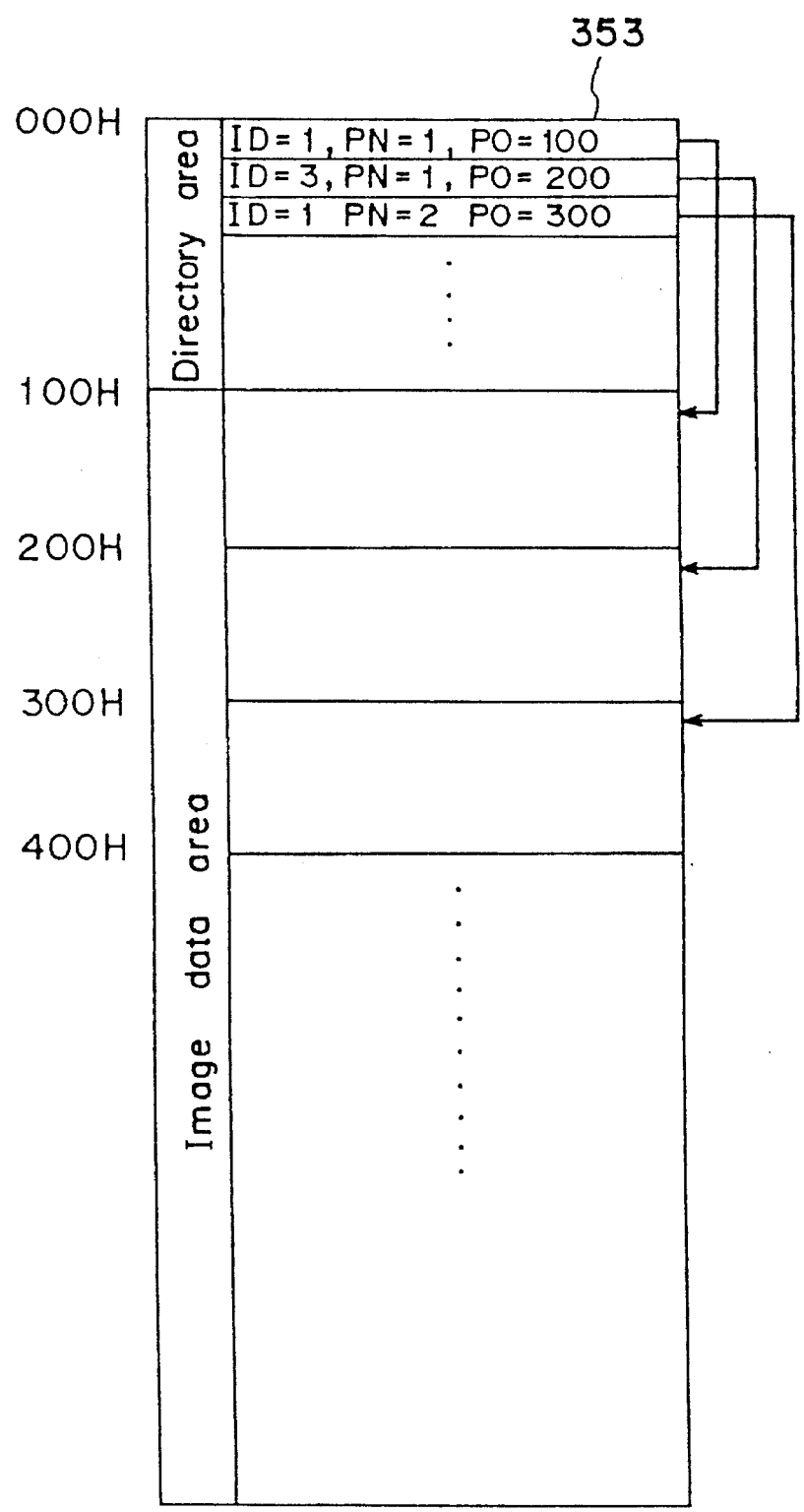
FIG. 14 is a diagram of the memory map of a RAM of FIG. 9 in the communicating sequence of FIGS. 13a and 13b.

A memory map of RAM 353 of the main controlling unit 300 when the image data is received by the main controlling unit 300 as described above is shown in FIG. 14.

Figure 15:
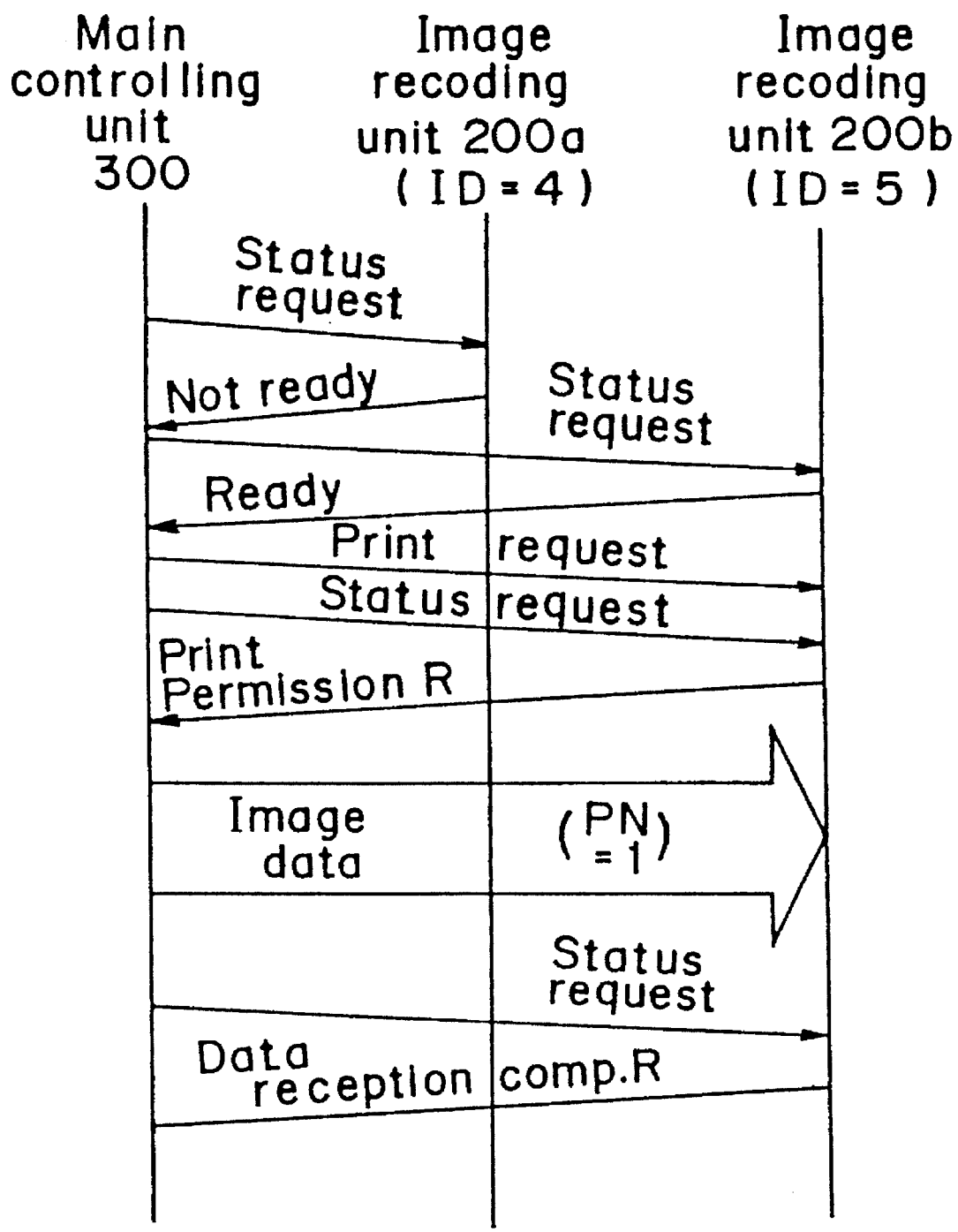
FIG. 15 is a diagram of a communicating sequence of the main controlling unit and each image recording unit.

FIG. 15 represents a communicating sequence between the main controlling unit 300 and image recording units 200a and 200b when the image recording unit 200a is in the not ready state, while the image recording unit 200b is in the ready state.

Referring to FIG. 15, when the main controlling unit 300 sends the status request signal to the image recording unit 200a, the status state signal of not ready is transmitted from the image recording unit 200a to the main controlling unit 300.

Then, when the main controlling unit 300 sends the status request signal to the image recording unit 200b, the image recording unit 200b responds by the status state signal of the ready state to the main controlling unit 300. Then, the main controlling unit 300 determines the image recording unit 200b to be fully prepared for recording an image, and accordingly it transmits the printing request command signal and the status request signal to the image recording unit 200b . In response thereto, image recording units 200b sends back a printing permission report signal to the main controlling unit 300. While reading the image data received from the facsimile apparatus of the other party and stored in the RAM 353, the main controlling unit 300 transmits the read image data to the image recording unit 200b . After the image data is transmitted thereto, the main controlling unit 300 transmits the status request signal to the image recording unit 200b. Then, if the image recording unit 200b completely finishes receiving of the image data, it sends a data reception completion report signal to the main controlling unit 300.

Thus, the image data has been perfectly transferred from the main controlling unit 300 to the image recording unit 200b.

(6) Process of Main Controlling Unit

Figure 16:
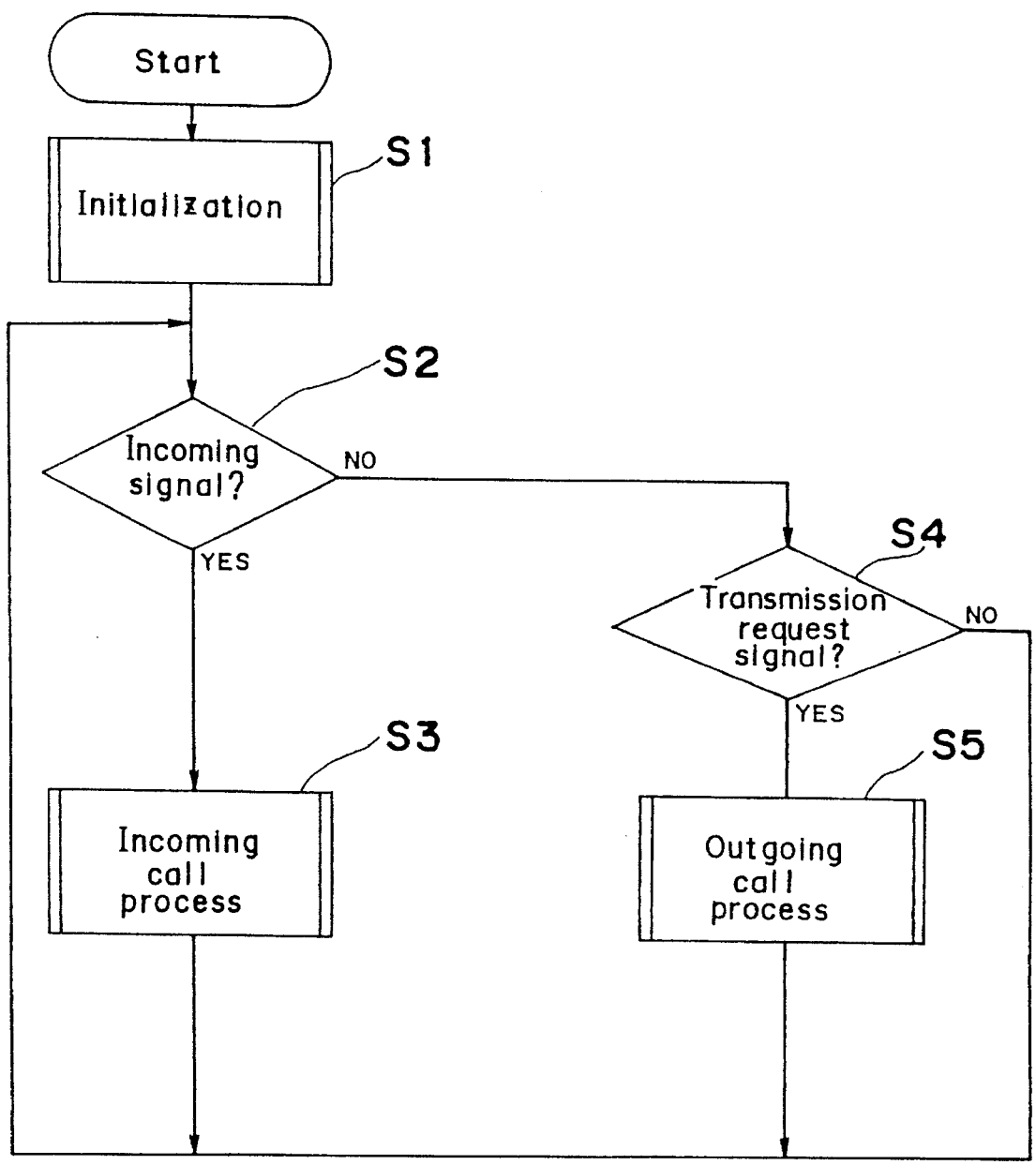
FIG. 16 is a flow chart of a main routine of the main controlling unit.

FIG. 16 is a flow chart of a main routine of the main controlling unit 300.

When the main controlling unit 300 is turned ON, the procedure of the main routine of FIG. 16 is started. In an initialization step S1, the priority parameter PP of each of the image reading units 100 and the image recording units 200 is reset to zero.

Figure 17:
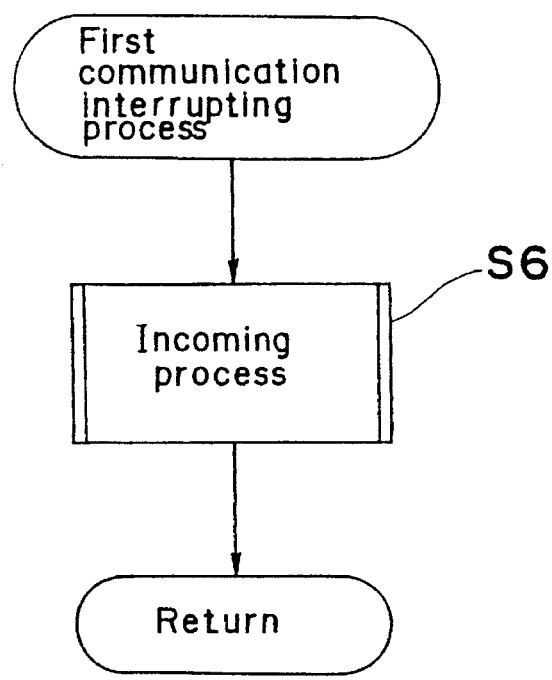
FIG. 17 is a flow chart of a first communication interrupting process of the main controlling unit.
Figure 18:
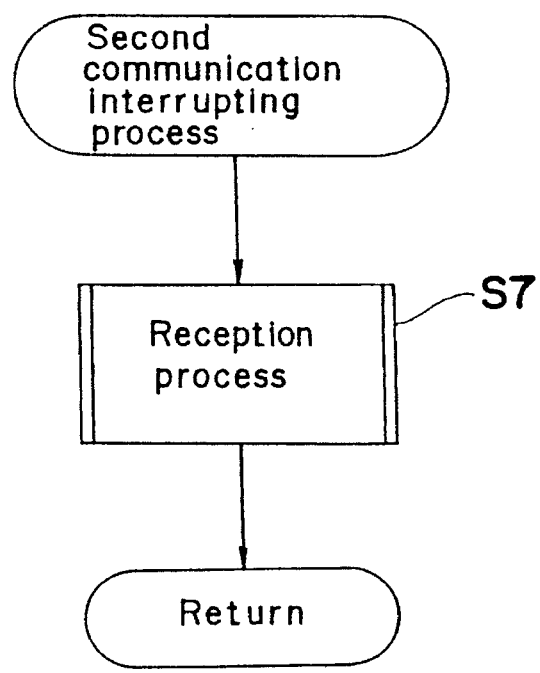
FIG. 18 is a flow chart of a second communication interrupting process of the main controlling unit.

At steps S2 and S4, the main controlling unit 300 is set in the standby state to wait for an incoming signal sent through the telephone line or a transmission request signal from the image reading unit 100. When the incoming signal is received from the telephone line, it is processed at step S6 in FIG. 17, i.e., in a first communication interrupting process. Meanwhile, a control signal sent from the image reading unit 100 or the image recording unit 200 is processed at step S7 of FIG. 18, namely, a second communication interrupting process.

In the case where the incoming signal from the telephone line is detected (YES at step S2), an incoming call process is performed at step S3. The program flow then returns to step S2. When the transmission request signal sent from the image reading unit 100 is detected (YES at step S4), an outgoing call process is performed at step S5, and the program flow is then returned to step S2.

The main controlling unit 300 performs the timer interrupting process periodically for every predetermined interrupting cycle (20 milliseconds in the present embodiment) in order to detect the operation states of the image reading unit 100 and image recording unit 200. In addition, the main controlling unit 300 carries out the timer interrupting process irregularly when it receives image data from the image reading unit 100 or it transmits image data to the image recording unit 200.

Figure 19:
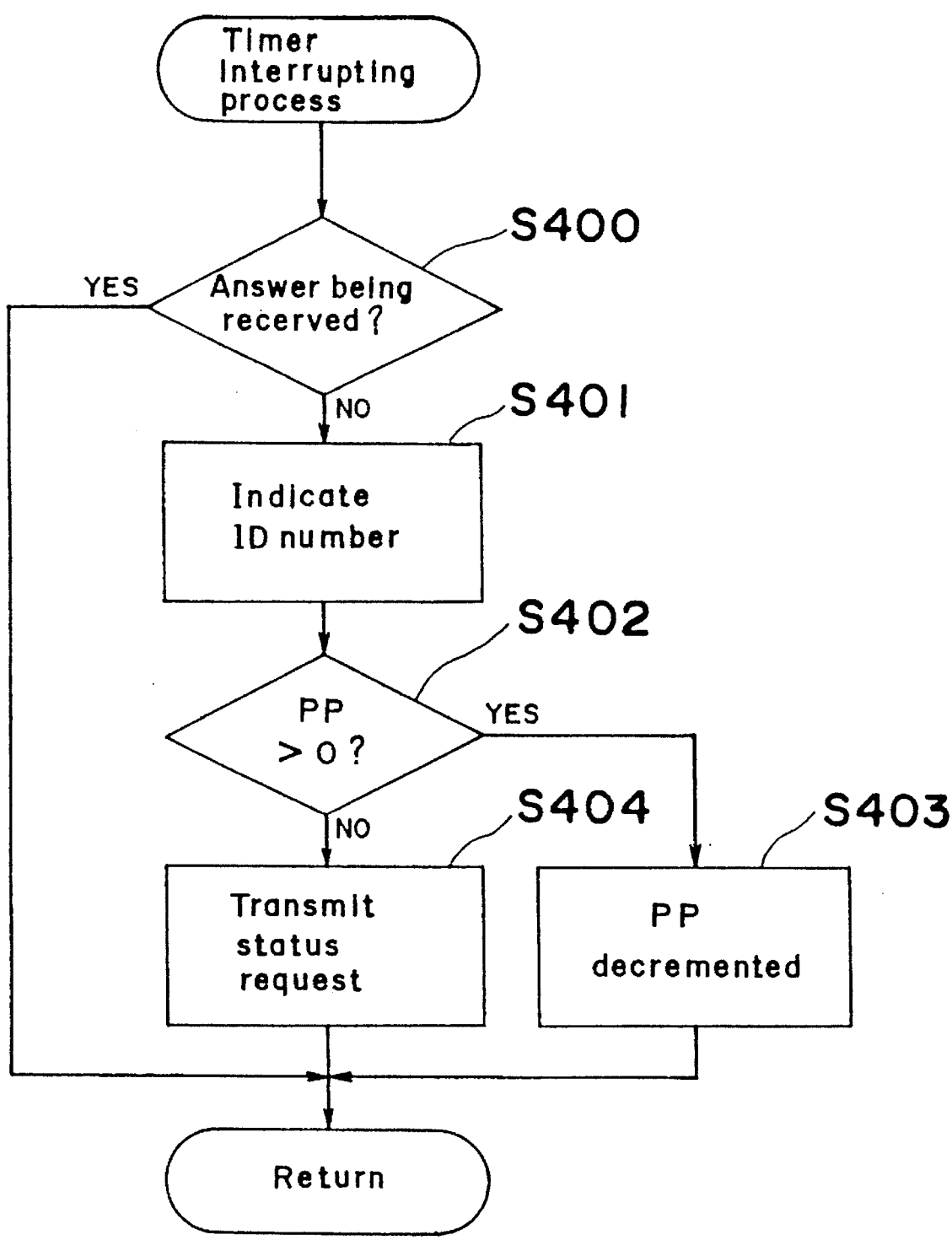
FIG. 19 is a flow chart of a timer interrupting process of the main controlling unit.

In the timer interrupting process shown in FIG. 19, it is detected at step S400 whether the status answer signal is being received in response to the status request signal transmitted from the main controlling unit 300. If the status answer signal is being received (YES at step S400), the program flow returns to the main routine. On the contrary, if the status answer signal is not being received (NO at step S400), the ID number of the image reading unit 100 or the image recording unit 200 (one among 1 to 5 in the instant embodiment) to be subjected to polling is indicated at step S401. It is to be noted that the ID number is updated every time the timer interruption is effected.

It is checked from the priority parameter PP at step S402 whether polling is prohibited to the designated image reading unit 100 or the image recording unit 200. That is, it is checked whether the priority parameter PP is not smaller than 0. The purpose of this checking will be depicted hereinbelow.

(a) The polling cycle of the image reading unit 100 or the image recording unit 200 currently not connected with the main controlling unit 300 should be set larger than that of the image reading unit 100 or the image recording unit 200 connected to the main controlling unit 300. In other words, polling should be performed with priority to the image reading unit 100 or the image recording unit 200 connected via the radio communication line to the main controlling unit 300.

(b) Polling should be prohibited for a fixed term for the image reading unit 100 which has completed the transmission of the image data, that is, the polling cycle of the image reading unit 100 which has completed the transmission should be made long thereby to avoid concentrative use of the image reading unit 100.

If the priority parameter PP of the designated image reading unit 100 or the image recording unit 200 is not smaller than 1 at step S402 (YES at step S402), polling is prohibited. The priority parameter PP is decremented by one at step S403 and the program flow returns to the main routine. On the other hand, if the priority parameter PP is 0 (NO at step S402), the image reading unit 100 or the image recording unit 200 is judged to be subjected to polling.

Therefore, at step S404 the status request command signal is sent to the image reading unit 100 or the image recording unit 200 designated at step S401, and then, the program flow returns to the main routine.

Figure 20:
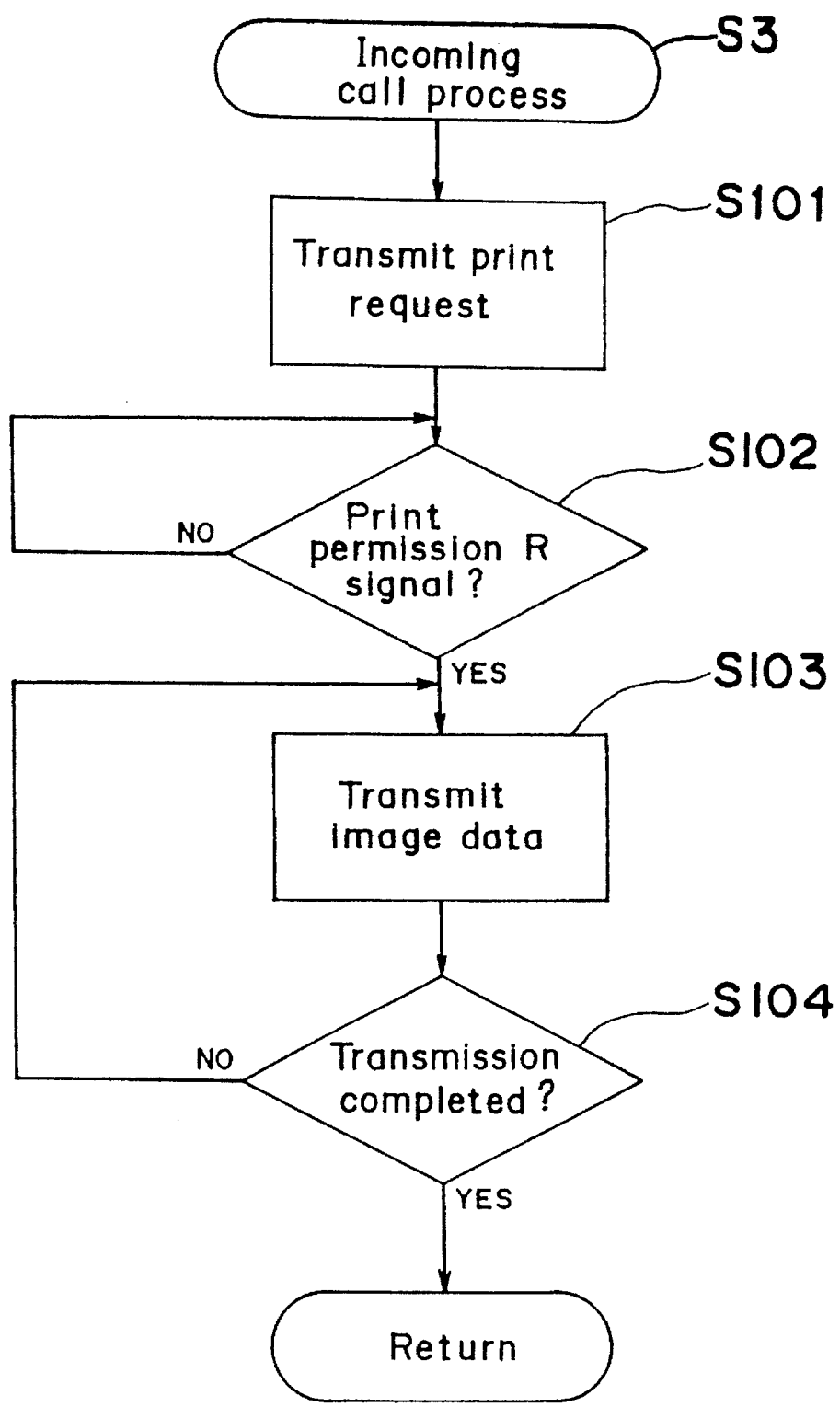
FIG. 20 is a flow chart of an incoming call process which is a subroutine of the main controlling unit.

FIG. 20 shows a flow chart of a subroutine of the main controlling unit 300 to process an incoming call (step S3 in FIG. 16).

At step S101 of FIG. 20, first of all, the printing request command signal is sent to the image recording unit 200 brought into the printable state through the polling and also the status request signal is transmitted thereto. The main controlling unit 300 is kept standby at step S102 until it receives the printing permission report signal from the designated image recording unit 200. Upon receipt of the printing permission report signal (YES at step S102), the image data received from the facsimile apparatus of the other party through the telephone line and stored in RAM 353 is read and transmitted to the designated image recording unit 200 at step S103. Thereafter, it is detected at step S104 whether the image data is completely transmitted. If the transmission is completed (YES at step S104), the program flow is returned from the subroutine to the main routine. Meanwhile, if the transmission is not finished (NO at step S104), the program flow returns to step S103 to transmit the image data.

Figure 21C:
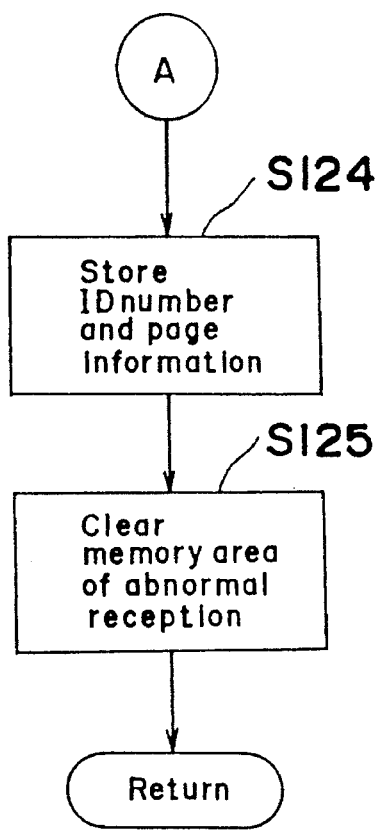

FIGS. 21a to 21c are flow charts of a subroutine of the main controlling unit 300 when an outgoing call is generated (step S5 of FIG. 16).

In the first step S111 of FIG. 21a, the main controlling unit 300 transmits the scanning request command signal to the image reading unit 100 which is turned into the ready state by transmitting the transmission request signal, thereby starting an image reading process. In the following step S112, the main controlling unit 300 transmits the status request signal to the image reading unit 100 which has transmitted the scanning request command signal, and waits until it receives the scanning start report signal added to the answer signal of the scanning request signal from the image reading unit 100. It is to be noted that the scanning start report signal is added with various kinds of information related to the image data as described earlier.

When the scanning start report signal is received at step S112 (YES at step S112), the information related to the image data coming together with the scanning start report signal and the leading address of the image data is stored in the directory area of RAM 353 shown in FIG. 1 at step S113.

In the instant facsimile system as described hereinabove, transmission of the answer signal is permitted only when the status request signal is received from the main controlling unit 300. Therefore, at step S114, the main controlling unit 300 sends the status request signal to the image reading unit 100. The status state signal of the image reading unit 100, the length of the image data and image data, etc. are transmitted from the image reading unit 100, as the answer signal to the status request signal to the main controlling unit 300, and then, the main controlling unit 300 receives them.

Thereafter, at step S115, it is judged whether the reception of the image data of one page is completed. In the next step S116, it is detected whether the image data is normally received. Further at step S117, it is checked whether the transmitting data completion report signal is received. More specifically, the status request signal is sent after the image data of one page is transmitted. Then, as the answer signal to the status request signal, the scanning end report signal indicating the end of reading of one page, the transmission data completion report signal indicating the end of reading of all the pages, or the status state signal of the error state or the fatal state is sent back from the image reading unit 100. Judgement at steps S115, S116, S117 is made based on the fact which of the above answer signals that the main controlling unit 300 receives.

When the transmission of the image data of one page is not completed without receiving the scanning end report signal received at step S115 (NO at step S115), the program flow is returned to step S114 to receive the image data again. If the status state signal of the error state or the fatal state is received (NO at step S116) as the answer signal, the procedure is judged to be abnormally ended because of the generation of a jamming or the like in the subject image reading unit 100. The program flow moves to step S124.

After the ID number of the image reading unit 100 wherein the procedure is ended abnormally and the current page number of the document are stored in RAM 363 at step S124, the directory information related to the subject page abnormally received and the image data are cleared from RAM 353 at step S125 since the directory information and image data are sent again when the jamming is solved. Thereafter, the program flow returns to the main routine.

The information stored in RAM 363 at step S124 is used to restart scanning by the image reading unit 100 after the jamming or the like is solved. For example, when the abnormal ending results from the jamming, the jammed document is returned and the image data of the document is transferred again when the transmission key 172 of the image reading unit 100 is depressed. More concretely, the main controlling unit 300 returns to the main routine after the processes at steps S124 and S125 are carried out, and the answer signal to the status request signal enables judgement whether the image reading unit 100 is in the ready state. Accordingly, by conducting periodic polling to the image reading unit 100 having a Jamming, it can be detected whether the jamming state is continued or the reading unit is returned to the ready state. When the main controlling unit 300 performs an outgoing call process of in FIG. 21*a* as the image reading unit 100 is turned to the ready state, the image data transmitted again from the image reading unit 100 is received.

In the present preferred embodiment, when one image reading unit 100 is hindered in the jamming state, the procedure of the main controlling unit 300 is returned to the main routine, so that polling is performed to the other image reading unit 100. If the other image reading unit is in the ready state, as indicated in the communicating sequence of FIGS. 13*a* and 13*b*, the image data from the other image reading unit 100 comes to be received. In other words, even when one image reading unit 100 is in the jamming state, it becomes possible according to the present embodiment to receive the image data from the other image reading unit 100. Accordingly, the facsimile system is effectively utilized and the using convenience of the facsimile system is improved as compared with the prior art.

Meanwhile, when only the scanning end report signal is received and the transmission data completion report signal is not received at step S117 (NO at step S117), since the document to be read remains in the subject image reading unit 100, the program flow goes to step S130, where the page information is incremented and updated. The program flow returns to step S111 to receive the image data again.

When the image data is normally received (YES at step S116) and the transmission data completion report signal is received as the answer signal (YES at step S117), it is detected at step S118 whether the continuous image reading process should be done in the other image reading unit 100. Referring to FIG. 21*b*, if the continuous image reading process is present (YES at step S118), the program flow goes to step S119. If the continuous image reading process is not present, the program flow moves to step S131.

The instant facsimile system has a function of batch process to meet a demand of the operator to send a large quantity of documents, for example, exceeding 30 sheets of documents. Therefore, the documents placed on the document trays 111 of a plurality of image reading units 100 can be processed at one time even though the number of the documents which can be set on the document tray 111 of the image reading unit 100 is 30. The concrete procedure of this continuous image reading process will be described hereinbelow.

(a) First of all, a plurality of documents are set on the document tray 111 of the image reading unit 100*b* (ID=2). After setting the image reading unit 100*b* for reading the images, the facsimile number of the other party, e.g., "4521112&3" is inputted and the transmission key 172 is depressed pressed. "4521112" is the facsimile number of the other party and "&3" shows that the document to be continuously read is to be placed in the image reading unit 100*c*. (ID=3).

(b) Then, the document is set on the document tray 111 of the image reading unit 100*c*. After the image reading unit 100*c* is set for reading the images, the facsimile number of the other party, that is, "&2" is inputted and the transmission key 172 is depressed. In this case, "&2" means that the document set in the image reading unit 100*c* is one consecutively following the document set in the image reading unit 100*b*. Since the facsimile number is already inputted in the image reading unit 100*b*, it is omitted here in the image reading unit 100c.

In the event another ADF-type image reading unit is connected in the instant facsimile system and the succeeding document is to be read by the ADF-type image reading unit, "&2&3" is inputted as the facsimile number of the other party thereby showing that the document is to be read continuously to the documents set in the image reading units 100*b* and 100*c*.

Referring back to FIG. 21*b*, it is detected at step S119 whether the whole of the documents is completely read out. If all the documents are finished to be read (YES at step S119), the program flow proceeds to step S131. On the other hand, if the documents are not completely read out (NO at step S119), the program flow returns to the main routine.

In order to lower the priority order for the image reading unit 100 which has finished reading of the images, at step S131, a predetermined value (5 in the instant embodiment) is set for the priority parameter PP of the image reading unit 100. Then, the facsimile apparatus of the other party is connected via the telephone line at step S120. Thereafter, it is checked at step S121 whether the telephone line is connected thereto. If not (NO at step S121), the program flow returns to step S120, where the telephone line is connected again. If the telephone line is perfectly connected (YES at step S121), the image data stored in RAM 353 is read out at step S122, converted into facsimile signals and sent to the facsimile apparatus of the other party through the telephone line.

It is judged at step S123 whether the facsimile signals are completely transmitted. When the signals are not completely transmitted (NO at step S123), the program flow returns to step S122 to transmit the remaining facsimile signals. On the other hand, when the facsimile signals have been completely transmitted (YES at step S123), the program flow returns to the main routine.

(7) Process of Image Reading Unit

Figure 22A:
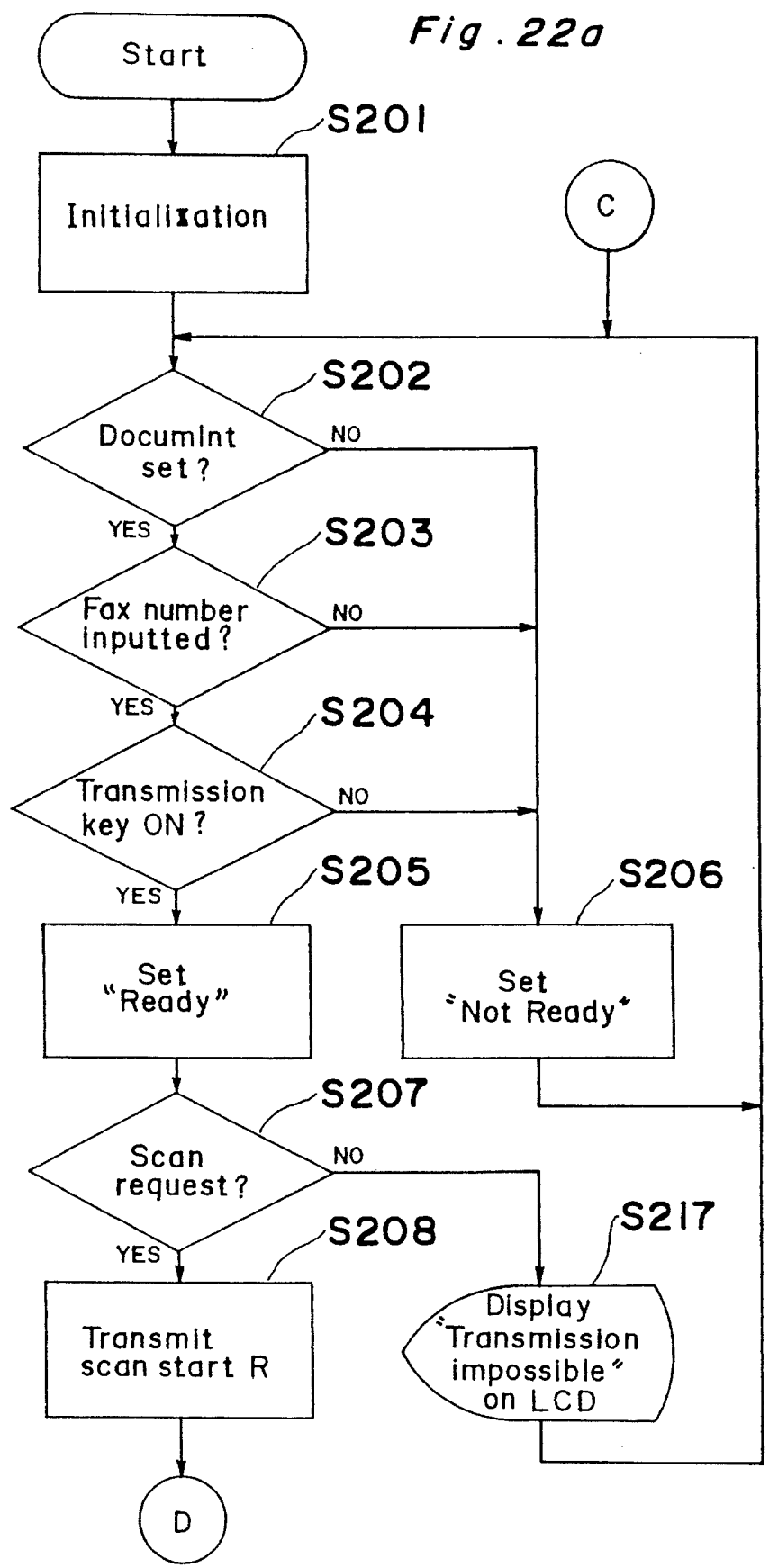
FIGS. 22a and 22b are flow charts of a main routine of the image reading unit.
Figure 22B:
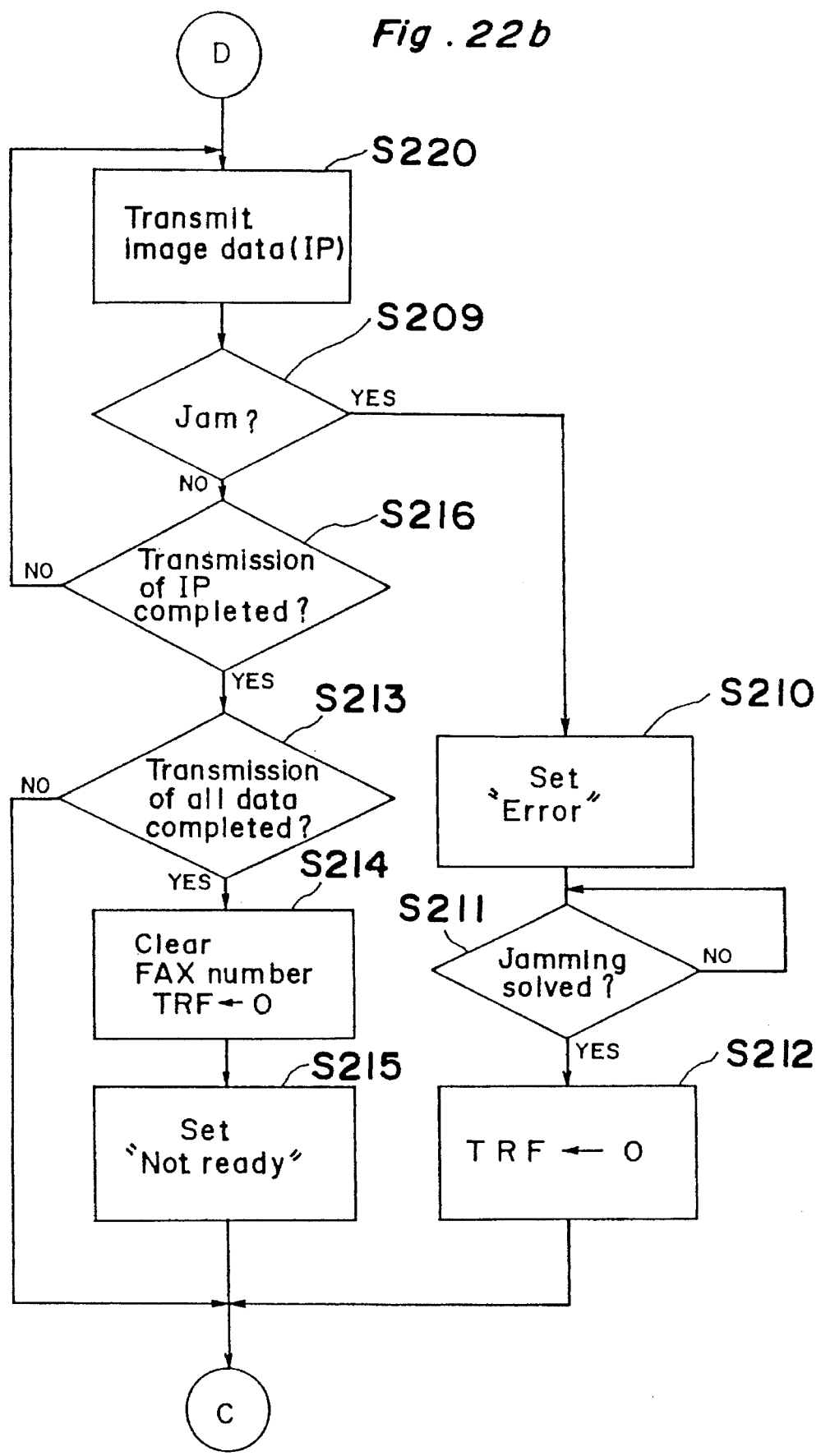

FIGS. 22a and 22b are flow charts of a main routine of the image reading unit 100.

Referring to FIG. 22a, a main routine is started when the image reading unit 100 is turned ON. Initialization is carried out at step S201, with the transmission flag TRF reset to 0.

Thereafter, it is checked at step S202 whether there is a document placed on the document glass 106 or the document tray 111. It is further checked at step S203 whether or not the facsimile number of the other party is inputted. At step S204, it is detected whether the transmission key is turned ON and the transmission flag TRF is 1. When the document is not present on the document glass 106 or the document tray 111 (NO at step S202), the facsimile number of the other party is not inputted (NO at step S203), or the transmission key is not turned ON and the transmission flag TRF is not 1 (NO at step S204), "not ready" is set as the status of the subject image reading unit 100 at step S206. Then, the program flow returns to step S202. On the other hand, if the document is placed on the document glass 106 or the document tray 111 (YES at step S202), the facsimile number of the other party is inputted (YES at step S203), and the transmission key is turned ON with the transmission flag TRF set to 1 (YES at step S204), the status of the subject image reading unit 100 is set to "ready" at step S205 followed by step S207.

The above-described "ready" state indicates that a transmission request is sent from the main controlling unit 300 to the image reading unit 100. It is detected at step S207 whether a scanning request command signal is sent from the main controlling unit 300 when the image reading unit 100 is in the ready state. If the scanning request command signal is not received (NO at step S207), the main controlling unit 300 is rendered in the busy state or some trouble takes place to obstruct receipt of the image data. Since the image data is not possible to be transmitted from the image reading unit 100 at this time, "transmission impossible" is displayed on the LCD 178 of the operating panel 156 at step S217, and the program flow returns to step S202. Meanwhile, when the scanning request command signal is received (YES at step S207), the scanning start report signal is added to the answer signal at step S208, which is sent to the main controlling unit 300. Accordingly, the image data of one page is transmitted at step S220.

Subsequently, it is judged at step S209 whether a jamming occurs in the image reading unit 100. In the presence of the jamming (YES at step S209), "error" is set as the status at step S210 and the program flow is kept standby at step S211 until the Jamming is solved. When the jamming is solved (YES at step S211), the transmission flag TRF is reset to 0 at step S212, with the program flow moving back to step S202.

On the other hand, without any jamming (NO at step S209), it is detected at step S216 whether the image data of one page is transmitted completely. If the transmission of the image data is not completed (NO at step S216), the program flow returns to step S220 of FIG. 22b to transmit the image data. If the image data is completely transmitted (YES at step S216), it is judged at step S213 whether the image data of the whole of the documents set in the image reading unit 100 is already transmitted. When the image data is not fully transmitted (NO at step S213), the program flow returns to step S202. On the contrary, if the image data is completely transmitted (YES at step S213), the facsimile number of the other party stored in RAM 163 is cleared at step S214, and the transmission flag TRF is reset to zero. Then, "not ready" is set as the status at step S215. The program flow is in turn returned to step S202.

Figure 23:
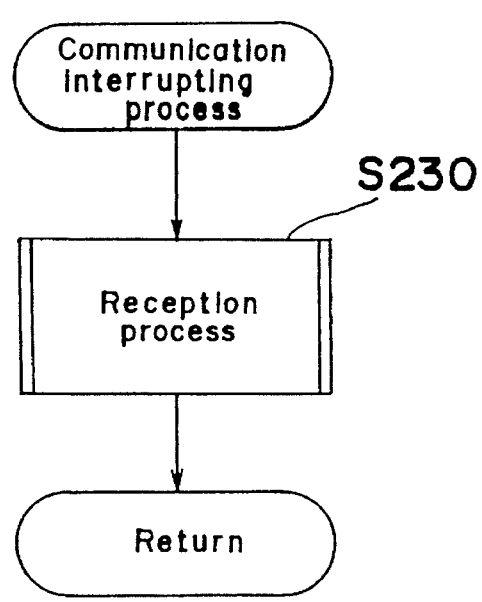
FIG. 23 is a flow chart of a communication interrupting process of the image reading unit.

FIG. 23 is a flow chart of the communication interrupting process of the image reading unit 100. At step S230 in the communication interrupting process, a control signal sent from the main controlling unit 300 is received. More concretely, when the status request signal is sent out from the main controlling unit 300, the status state signal indicative of the state of the image reading unit 100, if necessary, together with the report signal is transmitted to the main controlling unit 300.

(8) Process of Image Recording Unit

Figure 24:
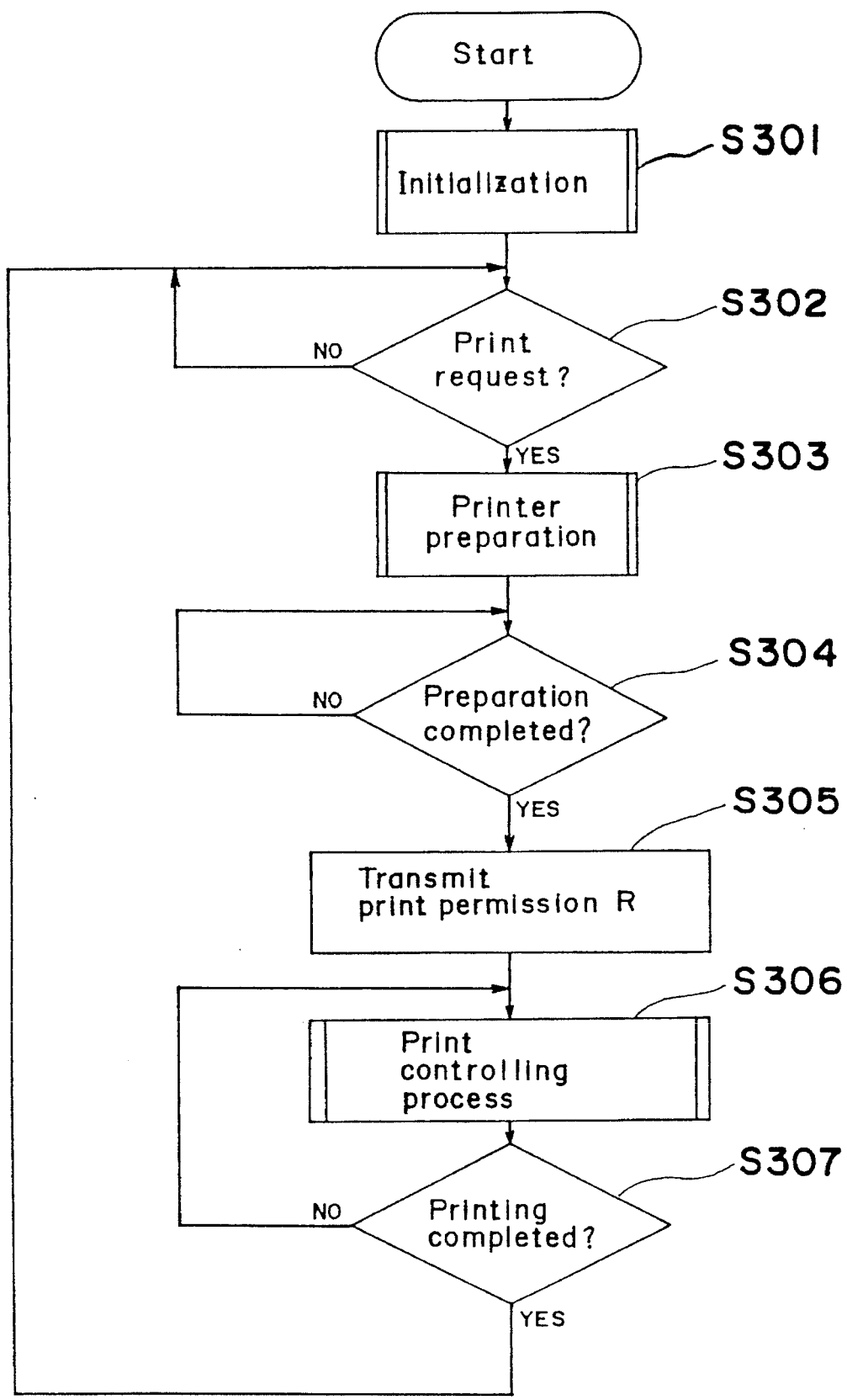
FIG. 24 is a flow chart of a main routine of the image recording unit.

FIG. 24 is a flow chart showing a main routine of the image recording unit 20.

In FIG. 24, a main routine is started when the image recording unit 200 is turned ON. At step S301 initialization is performed. Thereafter, at step S302, a printing request command signal sent from the main controlling unit 300 is waited.

Upon receipt of the printing request command signal from the main controlling unit 300 (YES at step S302), a preparatory process for the printer is conducted, for example, an image forming process or the like is prepared for the printer at step S303. When the preparatory process is completed (YES at step S304), a printing permission report signal is sent to the main controlling unit 300 at step S305. Thereafter, a print controlling process is carried out at step S306 so as to print images in accordance with the image data received from the main controlling unit 300. When the printing controlling process is completed (YES at step S307), the program flow returns to step 302, and again a printing request command signal is waited.

Figure 25:
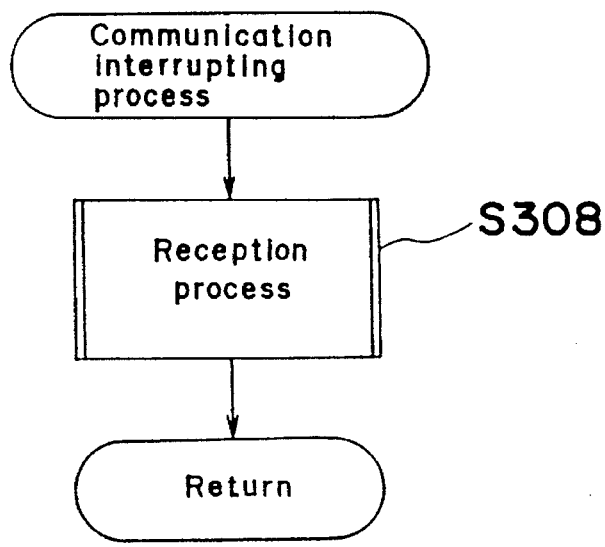
FIG. 25 is a flow chart of a communication interrupting process of the image recording unit.

FIG. 25 is a flow chart of a communication interrupting process of the image recording unit 200. A control signal sent from the main controlling unit 300 is received and processed in the image recording unit 200 at step S308. That is, when the status request signal is transmitted from the main controlling unit 300 to the image recording unit 200, the status state signal indicating the state of the image recording unit 200 and also the report signal if necessary are sent to the main controlling unit 300.

(9) Other Embodiments

In the foregoing embodiment, the facsimile system is in such a structure that the image reading unit 100, the image recording unit 200 and the main controlling unit 300 are provided separately from each other. However, the present invention is not limited to the foregoing embodiment, and it may be possible to integrally form any two of the three units into one.

Furthermore, according to the present embodiment, the main controlling unit 300 and image reading unit 100, and the main controlling unit 300 and image recording unit 200 are connected to each other via the radio communication line to transmit and/or receive control signals and image data therebetween. However, the present invention may be so modified that the main controlling unit 300 and image reading unit 100, and the main controlling unit 300 and image recording unit 200 are connected to each other through a cable or wire communication line.

In the above-mentioned preferred embodiment, in order to transmit and receive image data to and from a facsimile apparatus of a destination, the main controlling unit 300 is connected to the telephone line. However, the present invention is not limited to this. The main controlling unit may be connected to another type communication line for transmitting image data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A facsimile apparatus comprising:

a plurality of image reading units, each of said image reading units reading an image and converting said read image into image data; and a main controlling unit for receiving image data through a communication line and transmitting said received image data through another communication line to another facsimile apparatus of a destination, each of said image reading units including inputting means for inputting, according to a manual operation by an operator, an order of operation of any one of said plurality of image reading units, said main controlling unit comprising:

communication line connection means for connecting said main controlling unit through said communication line with one of said image reading units;

data reception means for receiving image data from said one of said image reading units connected through said communication line by said communication line connection means; and control means for controlling said communication line connection means to connect said main controlling unit sequentially with said any ones of said plurality of image reading units in said order inputted by said inputting means.

2. The apparatus as claimed in claim 1, wherein said main controlling unit is separately provided with said image reading units, and said communication line for connecting said main controlling unit with each of said image reading units is a radio communication line.

3. The apparatus as claimed in claim 1, wherein said main controlling unit is separately provided with said image reading units, and said communication line for connecting said main controlling unit with each of said image reading units is a wire communication line.

4. A facsimile apparatus comprising:

a plurality of image reading means, each of said reading means reading an image of a document and converting said read image into image data;

image data processing means for receiving image data sent from a plurality of said image reading means, and transmitting received image data to another facsimile apparatus of a destination;

inputting means for inputting, according to a manual operation by an operator, identification codes for identifying any respective ones of said plurality of image reading means; and control means for controlling said image data processing means to receive image data sequentially from said any respective ones of said plurality of image reading means corresponding to said identification codes which are inputted by said inputting means.

5. The apparatus as claimed in claim 4, wherein said inputting means is provided in respective ones of a plurality of said image reading means, and each of a plurality of said image reading means transmits said identification code inputted by said inputting means together with said image data.

6. The apparatus as claimed in claim 5, wherein said identification code inputted by said inputting means includes data for specifying one of a plurality of said image reading means to next read.

7. A facsimile apparatus comprising:

a plurality of image reading units, each of which reads an image and outputs image data corresponding to the read image;

a receiver which receives image data from one of said plurality of image reading units;

a specifying device which selects, according to a manual operation by an operator, more than one of the plurality of image reading units and which specifies an order of said selected ones of said image reading units; and a controller which controls said receiver to receive image data from said selected ones of said image reading units selected by said specifying device sequentially in the order specified by said specifying device.

8. The apparatus as claimed in claim 7, further comprising a transmitter which transmits image data received by said receiver to another facsimile apparatus of a destination.

9. The apparatus as claimed in claim 7, wherein said receiver is connected with each of said plurality of image reading units through a radio communication line.

10. A facsimile apparatus comprising:

a plurality of image reading units, each of which reads an image of a document placed on a document tray, and converts said read image into image data; and a main controlling unit which is connected to said plurality of image reading units through communication lines, wherein each of said image reading units includes:

an operating panel which inputs, according to a manual operation by an operator, a facsimile number of a further facsimile apparatus and an identification code of another image reading unit on which another document is placed to be continuously read after completion of reading an image of a document; and transmitting means for transmitting to said main controlling unit, said converted image data, the facsimile number of the further facsimile apparatus, and the identification code of the other image reading unit which are inputted by said operating panel, and wherein said main controlling unit includes:

receiving means for receiving the image data, the facsimile number and the identification code transmitted by said transmitting means of one of said image reading units;

transmitter means for transmitting the image data received by said receiving means, to the further facsimile apparatus corresponding to the facsimile number received by said receiving means; and a controller which controls said receiving means to receive continuously image data from the other image reading unit, the identification code of which is received by said receiving means after completion of reception of the image data from said one of said image reading units.

* * * * *